(12) United States Patent
Fulks et al.

(10) Patent No.: US 7,485,984 B2
(45) Date of Patent: Feb. 3, 2009

(54) CONTROL MODULE

(75) Inventors: Gary C. Fulks, Dayton, OH (US);
Douglas E. Poole, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 293 days.

(21) Appl. No.: 11/432,954

(22) Filed: May 12, 2006

(65) Prior Publication Data
US 2007/0262656 A1    Nov. 15, 2007

(51) Int. Cl.
*B60L 1/00* (2006.01)

(52) U.S. Cl. .................................... 307/10.1
(58) Field of Classification Search ............... 307/10.1
See application file for complete search history.

(56) References Cited

U.S. PATENT DOCUMENTS

| | | | |
|---|---|---|---|
| 4,546,997 A | 10/1985 | Smyers | 280/772 |
| 4,573,698 A | 3/1986 | Takahashi et al. | 280/279 |
| 5,510,974 A | 4/1996 | Gu et al. | 363/134 |
| 5,525,925 A | 6/1996 | Bayer | 327/377 |
| 5,648,759 A | 7/1997 | Miller et al. | 340/660 |
| 5,742,196 A | 4/1998 | Fronen et al. | 327/382 |
| 5,971,782 A | 10/1999 | Masuda | 439/164 |
| 6,054,738 A | 4/2000 | Sander et al. | 257/341 |
| 6,082,171 A | 7/2000 | Wiggenhagen | 73/1.75 |
| 6,108,215 A | 8/2000 | Kates et al. | 363/17 |
| 6,124,751 A | 9/2000 | Pidutti | 327/424 |
| 6,272,912 B1 | 8/2001 | Sano | 73/118.1 |
| 6,279,920 B1 | 8/2001 | Choudhery | 280/5.521 |
| 6,292,036 B1 * | 9/2001 | Archer | 327/110 |
| 6,366,060 B1 | 4/2002 | Ely et al. | 322/25 |
| 6,388,525 B1 | 5/2002 | Bien | 330/282 |
| 6,404,267 B1 | 6/2002 | Duve | 327/531 |
| 6,410,909 B1 | 6/2002 | Rudolph et al. | 250/231.13 |
| 6,411,534 B1 | 6/2002 | Kurnia et al. | 363/98 |
| 6,437,607 B1 | 8/2002 | Milanesi | 327/90 |
| 6,488,115 B1 | 12/2002 | Ozsoylu et al. | 180/444 |
| 6,498,971 B2 | 12/2002 | Leaphart | 701/41 |
| 6,529,034 B1 | 3/2003 | Ranjan | 326/19 |
| 6,573,752 B1 | 6/2003 | Killat | 326/83 |
| 6,580,325 B1 | 6/2003 | Aude | 330/260 |
| 6,597,181 B2 | 7/2003 | Boran et al. | 324/525 |
| 6,691,819 B2 | 2/2004 | Menjak et al. | 180/446 |
| 6,707,101 B2 | 3/2004 | Ranjan | 257/339 |
| 6,742,402 B1 | 6/2004 | Volz et al. | 73/862.192 |
| 6,768,944 B2 | 7/2004 | BayerBreed et al. | 701/301 |
| 6,776,634 B2 | 8/2004 | Besier et al. | 439/164 |
| 6,789,017 B2 | 9/2004 | Aanen et al. | 701/401 |
| 6,805,362 B1 | 10/2004 | Melcher | 280/5.52 |
| 7,027,939 B2 * | 4/2006 | Fey et al. | 702/64 |
| 2006/0022420 A1 | 2/2006 | Pressler et al. | 280/93.512 |

* cited by examiner

*Primary Examiner*—Robert L. Deberadinis
(74) *Attorney, Agent, or Firm*—Thomas N. Twomey

(57) ABSTRACT

An electronic control system 310 is provided for independent actuation of a plurality of hydraulic actuators 38, 39. The electronic control system 310 employs an electronic driver 314 connected to a first parallel circuit or first low side driver 316, and a second parallel circuit or second low side driver 330. Each parallel circuit 316, 330 contains a first and a second actuator L1, L2, respectively, connected in series to a first and a second low side MOSFET Q9 and Q10, respectively. Pulse width modulation of the electronic driver 314 in conjunction with selective actuation of either low side driver 316, 330 results in rapid response to system control algorithms whereby each actuator L1 or L2 may be de-activated in a relatively quick manner thereby improving vehicular control.

18 Claims, 16 Drawing Sheets

US 7,485,984 B2

CONTROL MODULE

BACKGROUND

The present invention relates to vehicles with lean control systems. In particular, the present invention relates to vehicles with primary and auxiliary lean control systems coupled to a vehicle lean suspension system for enhancing vehicle stability.

Certain types of vehicles are unstable (e.g., more prone to rolling over) in certain modes of operation. For example, a three-wheeled vehicle that permits roll axis articulation may be unstable when the vehicle center of gravity is located above the roll axis. Under normal operation, many such instabilities are compensated for by using a closed loop control system (for example, an electro-hydraulic or electro-mechanical system) including or coupled to elements of the vehicle systems (for example, elements of the vehicle suspension system) which are actuatable in response to a signal from a control unit. Based on feedback to the control unit from vehicle system elements and sensors, signals from the control unit actuate the responsive vehicle system elements to stabilize the configuration of the vehicle. For example, vehicle lean control systems may cause the body of the vehicle to lean into a turn, thereby increasing the stability of the vehicle during turning.

In hydraulically-actuated lean control systems, the lean control system may fail to function properly in the event of loss of hydraulic control (due to normal system shutdown, vehicle or hydraulic system power loss, hydraulic fluid leakage, etc.) In this instance, it is desirable that the vehicle is returned to and maintains an upright (no lean) configuration until hydraulic control can be restored. It is also desirable that the configuration of the vehicle, in the absence of hydraulic control, be as stable as possible.

Another concern includes the size of various components of the vehicle control circuitry. An ongoing challenge is to improve the control of the vehicle, and enhance control system response time, while minimizing the size of the control circuitry. Furthermore, circuits containing a power MOSFET may be disadvantaged by MOSFET breakdown due to reverse-biased avalanche mode, once the MOSFET has been de-energized. A circuit addressing these concerns would be an improvement in the art.

SUMMARY

In accordance with the present invention, an auxiliary lean control system is provided for controlling a lean angle of at least a portion of a vehicle. The lean control system includes an energy storage device for storing energy to actuate the lean control system, a stabilizing mechanism coupled to the energy storage device and to the portion of the vehicle for applying energy received from the energy storage device to the portion of the vehicle to adjust the lean angle of the portion of a vehicle, and a linkage coupled to the energy storage device and to the stabilizing mechanism for transferring energy from the energy storage device to the stabilizing mechanism. The auxiliary lean control system controls the lean angle of the portion of the vehicle in an absence of control of the lean angle by a primary lean control system.

In another aspect, the present invention provides a vehicle including a vehicle suspension apparatus and a vehicle lean control system coupled to the vehicle suspension apparatus for controlling a lean of at least a portion of the vehicle, the suspension apparatus being operable independent of the vehicle lean control system.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and coupled and variations thereof are used broadly and encompass both direct and indirect mountings, connections, supports, and couplings. Further, "connected" and "coupled" are not restricted to physical or mechanical connections or couplings. Also as used herein, the "lean angle" of the vehicle is defined as the angle at which a tiltable or leanable portion of the vehicle leans with respect to a road or other surface on which the vehicle rests.

Figure 1:
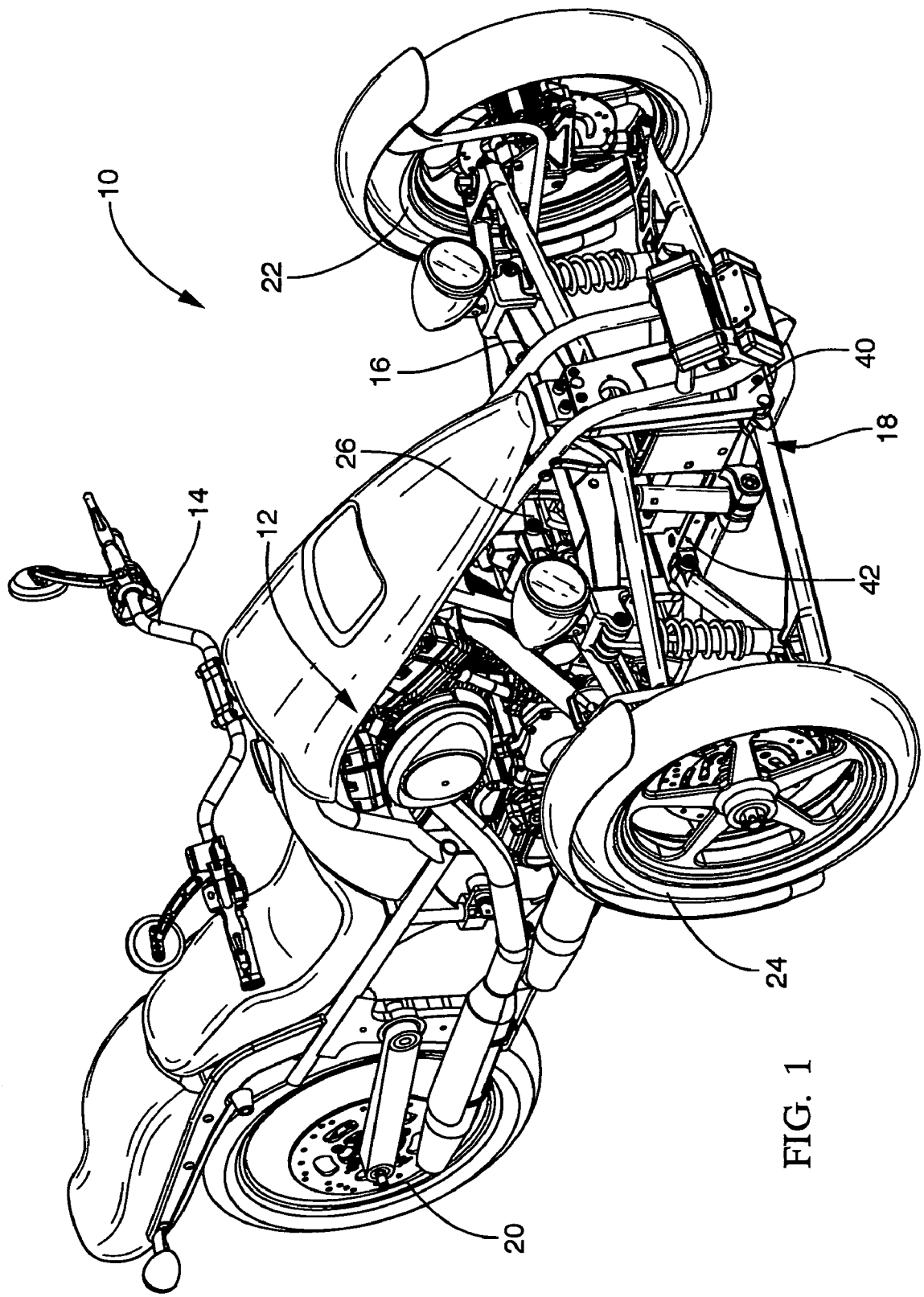
FIG. 1 is a perspective view of a three-wheeled motorcycle including a leaning front suspension with an auxiliary lean control system embodying the present invention.
Figure 2:
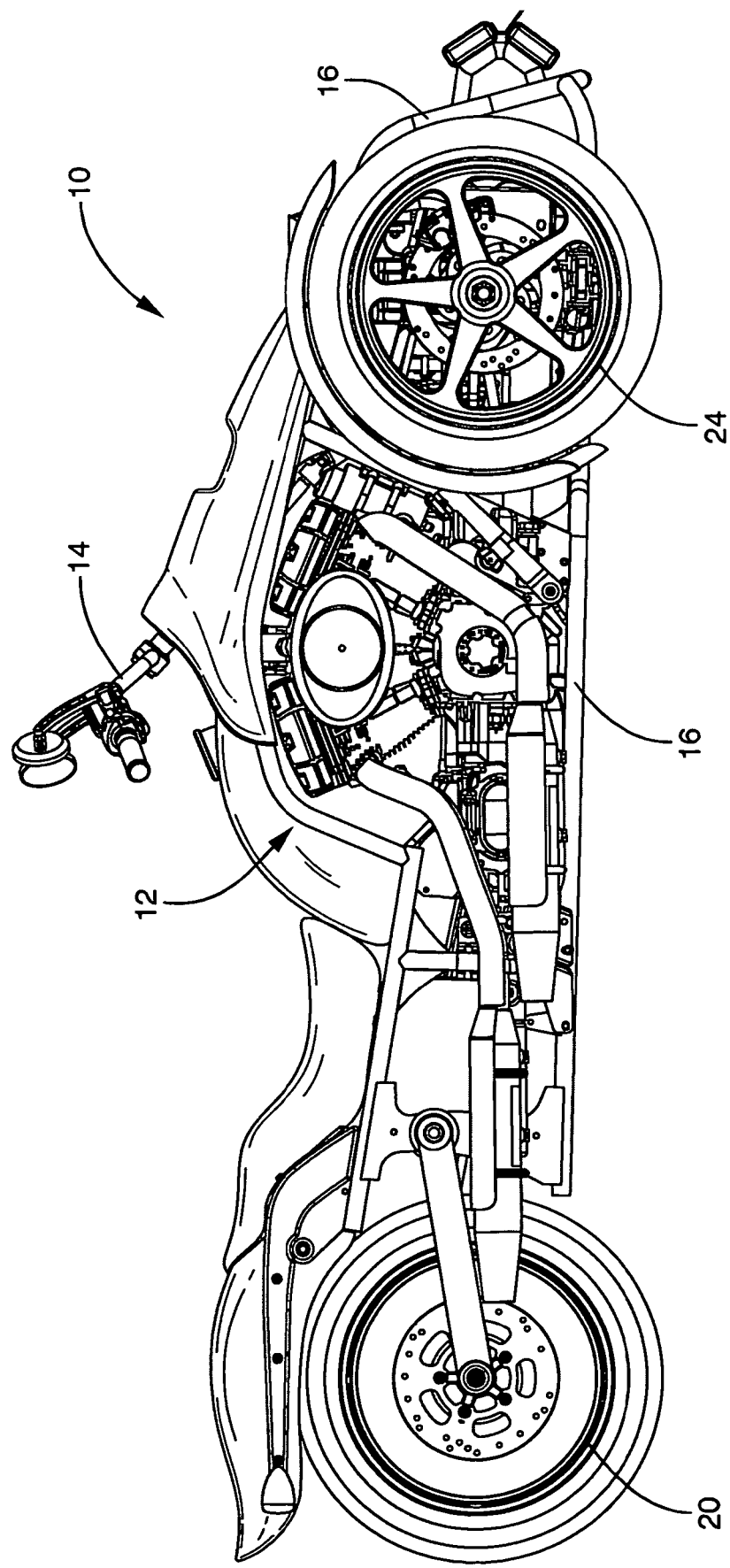
FIG. 2 is a side view of the three-wheeled motorcycle of FIG. 1.

FIGS. 1 and 2 illustrate a three-wheeled motorcycle or trike 10 having an engine 12, handlebars 14, a frame 16, a single rear wheel 20, first and second front wheels 22, 24, and an auxiliary lean control system 26. The rear wheel 20 is rotatably mounted to a rear portion of the frame 16, and the front wheels 22, 24 are coupled to the frame 16 via a leaning suspension system 18. The frame 16 includes a front bulkhead 40 and a main bulkhead 42 defining the front portion of the frame 16. The front bulkhead 40 is connected to the main bulkhead 42 to stiffen and strengthen the entire suspension system 18. The engine 12 is coupled to the rear wheel 20 through a drive assembly (not shown) to propel the trike 10. The handlebars 14 are pivotally coupled to the front portion of the frame 16 and coupled to the front wheels 22, 24 through a steering system to controllably turn the front wheels 22, 24.

The illustrated embodiment is for a trike 10 having two steerable front wheels 22, 24 and a single, driven rear wheel 20. It should be noted that it is within the scope of the invention to employ the suspension system and lean control systems of the present invention in a vehicle having two rear wheels and a single front wheel. Also, in other embodiments, the suspension system and lean control systems can be used for the front wheels, the rear wheels, or both the front and rear wheels in a vehicle having four wheels, such as an ATV.

Figure 3:
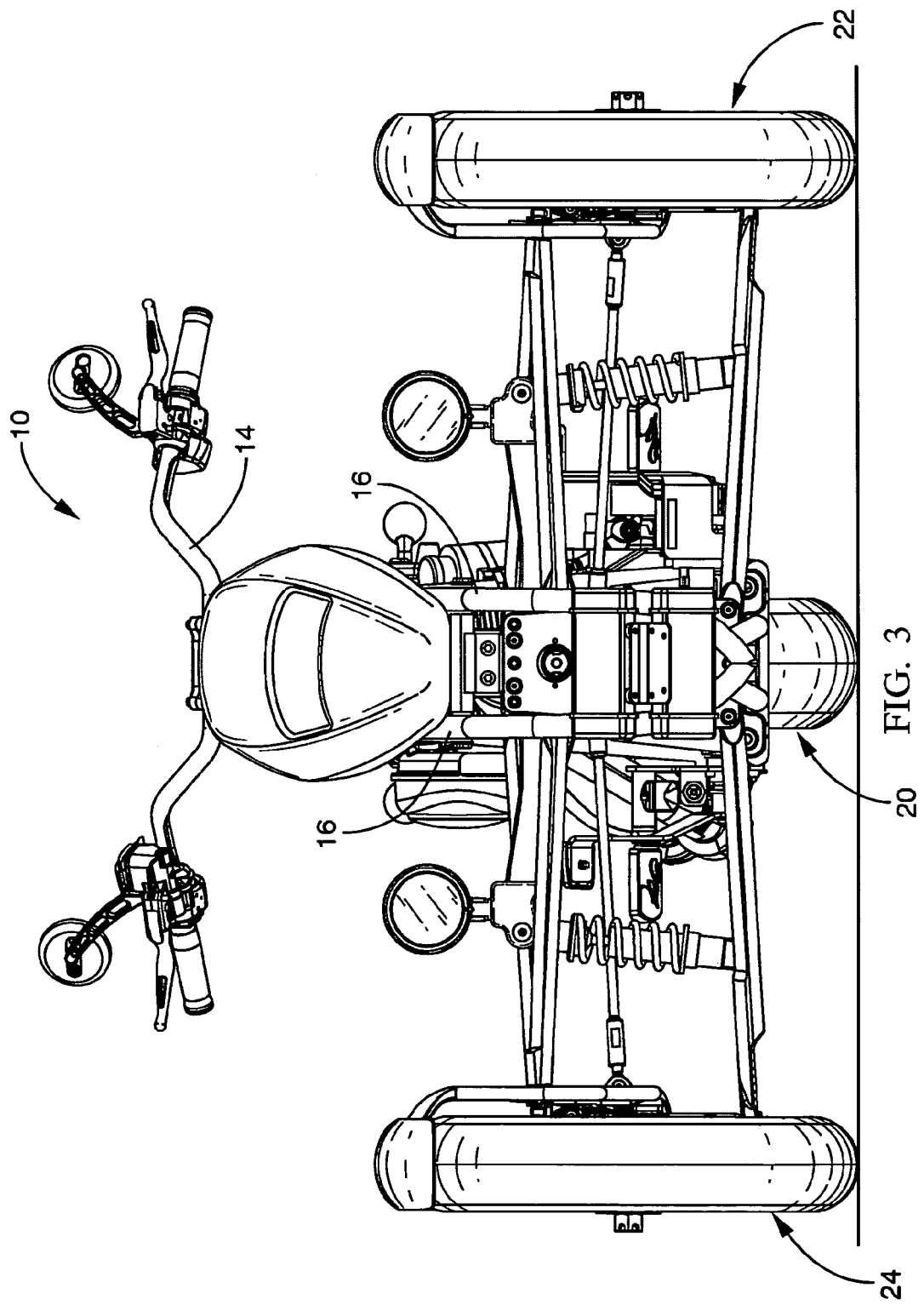
FIG. 3 is a front view of the three-wheeled motorcycle of FIG. 1, illustrating the three-wheeled motorcycle in an upright position.
Figure 4:
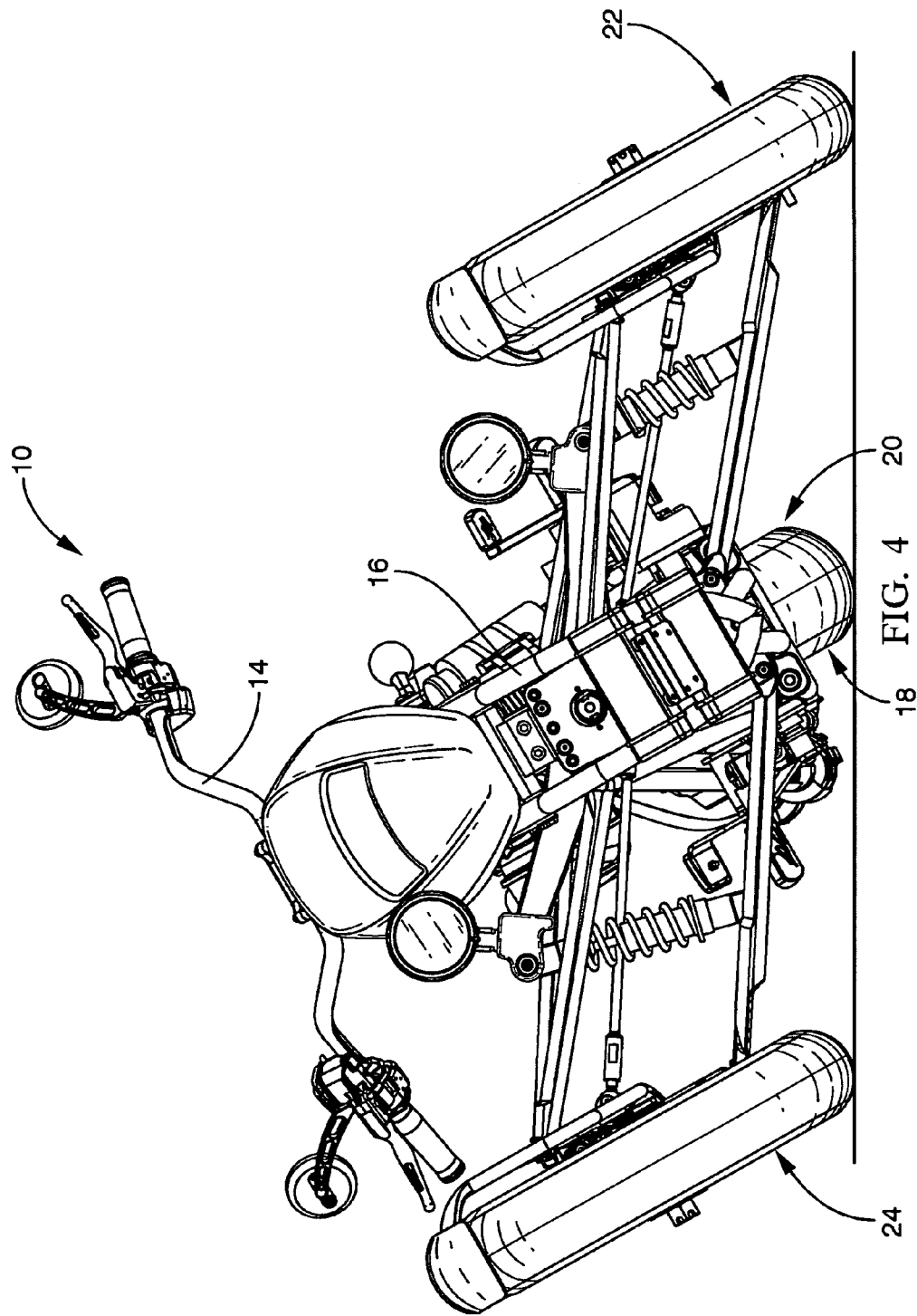
FIG. 4 is a front view of the three-wheeled motorcycle of FIG. 1, illustrating the three-wheeled motorcycle in a leaning position.

FIG. 3 illustrates a front view of the trike 10 of FIG. 1, showing the leaning suspension system 18 in an upright position. This position illustrates the orientation of the suspension system 18 while the trike 10 tracks a straight line on a flat surface. FIG. 4 illustrates the front view of the trike 10 in a leaning configuration. This view shows how the suspension system 18 is oriented when the trike 10 is turning, or tracking an arcuate path. It should be noted that in order to highlight the different positions of the suspension system 18 between FIGS. 3 and 4, the handlebar 14 and wheel 22, 24 positions are illustrated in the same center straightforward position for both FIGS. 3 and 4. Although this position is correctly illustrated in FIG. 3 the handlebar 14 position and the wheel 22, 24 positions in FIG. 4 should be pivoted and turned, respectively, toward or into the direction of the turn.

As used herein, the term "leaning suspension system" is defined as a suspension system that permits and/or facilitates leaning of a portion of the vehicle, wherein the leaning is initiated in response to forces exerted on the vehicle during turning of the vehicle by an active or passive lean control system installed in the vehicle.

Figure 5:
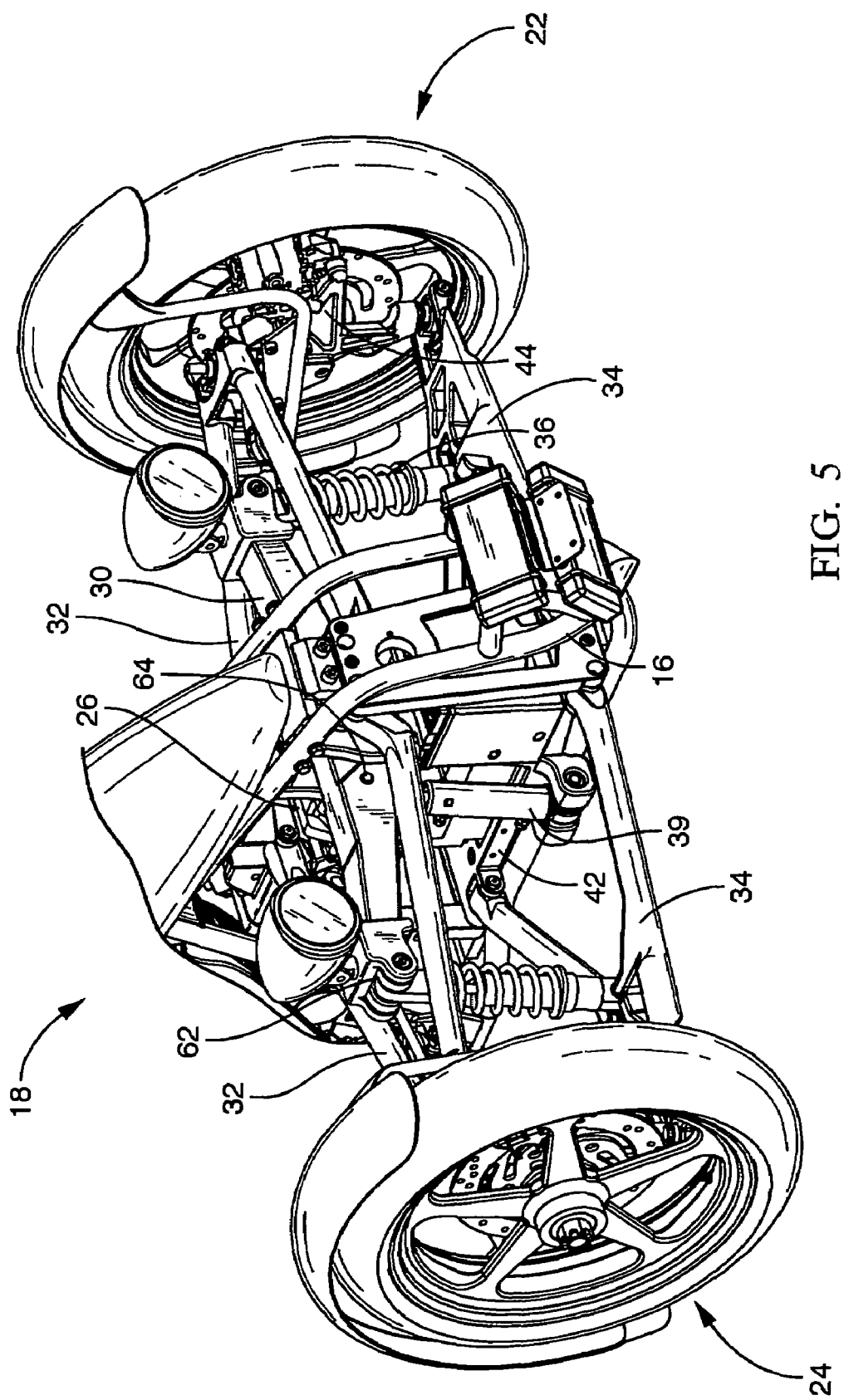
FIG. 5 is an enlarged perspective view of the front suspension of the three-wheeled motorcycle of FIG. 1.
Figure 6:
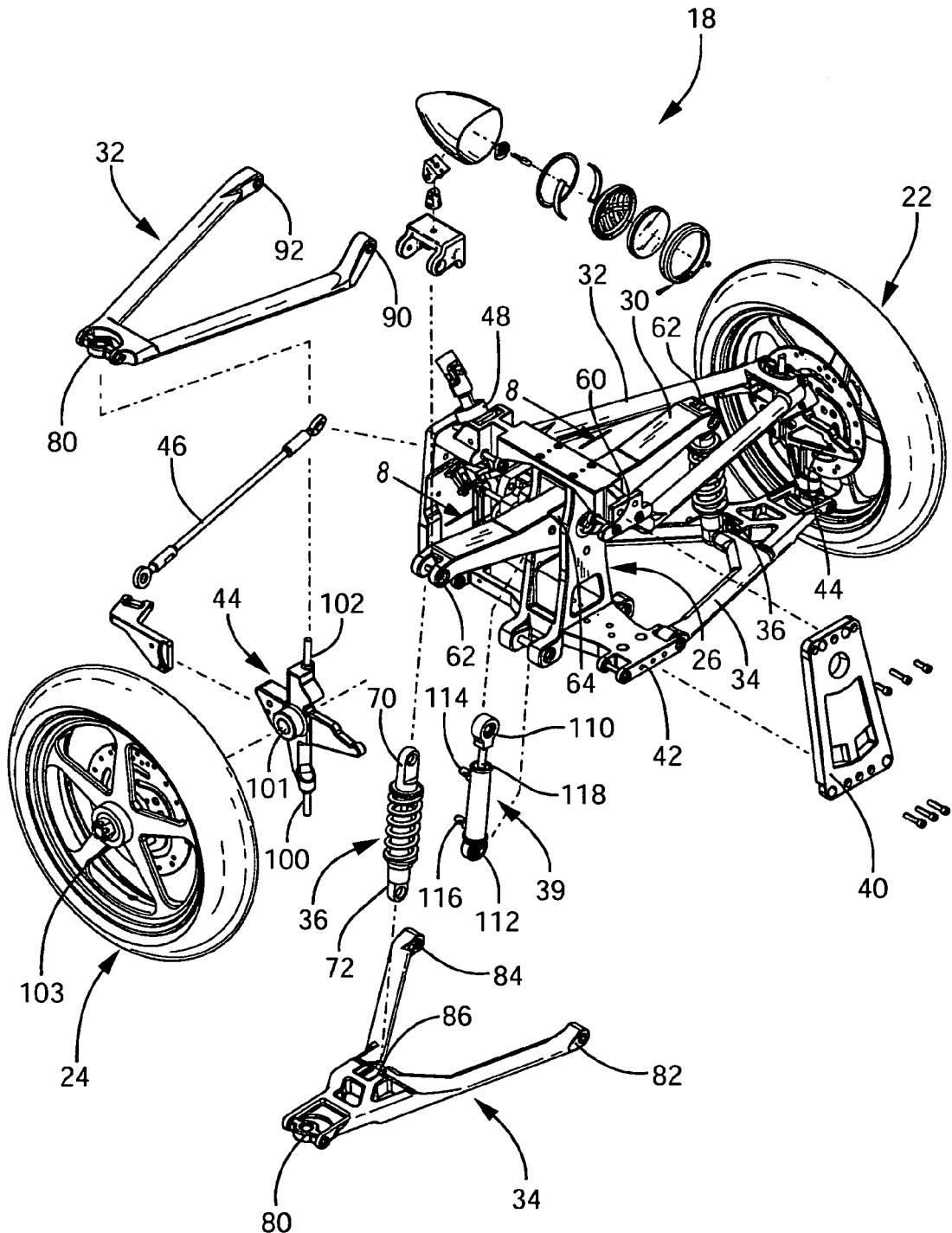
FIG. 6 is an exploded perspective view of the front suspension of the three-wheeled motorcycle of FIG. 1.

FIGS. 5 and 6 illustrate a perspective view and an exploded perspective view of the leaning suspension system 18, respectively. The leaning suspension system 18 includes a transverse beam 30, upper control arms 32, lower control arms 34, spring dampers 36, and spindles 44. The spindles 44 each include upper and lower pins 102, 100, as well as means for rotatably coupling to one of the front wheels 22, 24, such as a hole 101 for receiving a wheel axle 103. The structure of the spindle 44 is well known to those skilled in the art.

Figure 9:
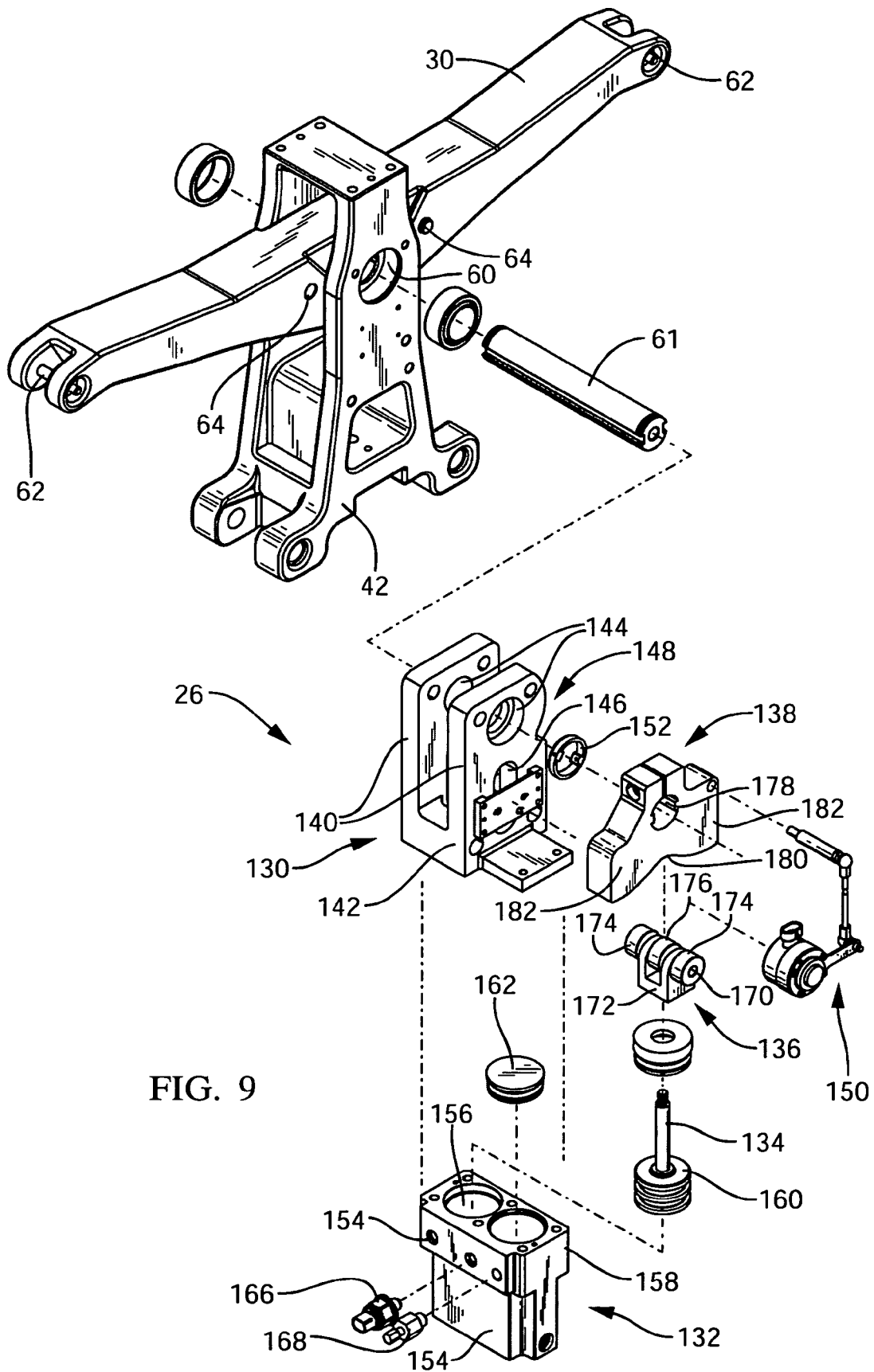
FIG. 9 is an exploded perspective view of one embodiment of the auxiliary lean control system for the three-wheeled motorcycle of FIG. 1.

The transverse beam 30 is rigid and remains substantially horizontal during operation of the trike 10. The transverse beam 30 has a center pivot point 60, end pivot points 62, and intermediate pivot points 64. In the embodiment shown in FIGS. 5 and 6, transverse beam 30 is pivotally coupled to a portion of the main bulkhead 42 at the center pivot 60 using a keyed shaft 61 (FIG. 9). However, other methods of coupling beam 30 to main bulkhead 42 are also contemplated. The center pivot 60 is positioned to coincide with a longitudinal centerline of the trike 10 and defines a pivot axis that is parallel to the vehicle centerline. The end pivot points 62 are pivotally coupled to upper pivots 70 on the spring dampers 36.

The lower control arms 34 have trunnions 80 rotatably coupled to one end and adapted to rotatably receive the lower pin 100 on the spindles 44. These trunnions 80 allow the suspension to operate independent of wheel steering by permitting the spindles 44 to pivot and turn regardless of the position of the lower control arms 34. The two remaining ends of the lower control arms 34 include front and rear pivot points 82, 84 that are pivotally connected to the main bulkhead 42. Central pivot 86 is located centrally on the lower control arms 34 and is adapted to pivotally couple to lower pivot points 72 on the spring dampers 36.

The upper control arms 32 also have trunnions 80 rotatably coupled to one end adapted to rotatably receive the upper pin 102 on the spindles 44. These trunnions 80 allow the suspension to operate independent of wheel steering. The two remaining ends of the upper control arms 32 include front and rear pivot points 90, 92 that are pivotally connected to the main bulkhead 42.

In the illustrated embodiment, the transverse beam 30 is positioned between the front and rear pivots 90, 92 on the upper control arms 32. In other embodiments, the transverse beam 30 could be positioned in front of the front pivots 90, behind the rear pivots 92, or coupled to a different location than the upper control arms 32 (i.e. coupled to a different bulkhead).

As mentioned above, the spring dampers 36 include upper and lower pivot points 70, 72 connecting the transverse beam 30 to the lower control arms 34. The spring dampers 36 include a shock-absorbing member surrounded by a biasing member. This style of spring damper 36 is well known to those skilled in the art, and will not be discussed in further detail. Alternative embodiments may utilize a different method of biasing and shock absorbing, such as leaf springs, coil springs, or air springs.

A first or primary vehicle lean control system affects the attitude or orientation of vehicle bulkheads 40 and 42 with respect to the ground on which the vehicle rests. Referring again to FIG. 6, the primary lean control system includes hydraulic actuators 38, 39 having upper and lower pivot points 110, 112. The illustrated embodiment shows the upper pivot points 110 of the hydraulic actuators 38, 39 are pivotally coupled to the intermediate pivot points 64 on the transverse beam 30 at a location between the center pivot point 60 and one of the end pivot points 62. Other embodiments could include the hydraulic actuators 38, 39 pivotally coupled to the end pivot points 62 and the spring dampers 36 pivotally coupled to the transverse beam 30 at a location between the center pivot point 60 and one of the end pivot points 62. The hydraulic actuators 38, 39 and spring dampers can also be pivotally coupled to other points along the transverse beam 30.

The hydraulic actuators 38 shown in the illustrated embodiment include a cylinder having top and bottom fluid ports 114, 116. A piston (not shown) exists at the end of a shaft 118 within each cylinder. When hydraulic fluid is forced into the top fluid port 114 by a hydraulic pump (not shown), the internal piston is forced down, and the shaft 118 retracts. While this is happening, hydraulic fluid is being forced out of the bottom fluid port 116 and into a reservoir (not shown). When hydraulic fluid is forced into the bottom fluid port 116, the internal piston is forced up, and the shaft 118 extends. While this is happening, hydraulic fluid is being forced out of the top fluid port 114 and into the reservoir.

The steering system includes spindles 44, tie rods 46, and the steering box 48. The handlebars 14 are coupled to the steering box 48 such that when an operator turns the handlebars 14, an output shaft (not shown) on the steering box 48 rotates. The output shaft is pivotally coupled to a first end of each tie rod 46. The second end of each tie rod 46 is pivotally coupled to one of the spindles 44. As the output shaft on the steering box 48 rotates, the tie rods 46 follow, pulling one spindle 44 and pushing the other. The spindles 44 are rotatably coupled to the upper and lower control arms 32, 34 by upper and lower pins 102, 100. Thus the pushing or pulling action initiated by the tie rods 46 causes the spindles 44, and thus the front wheels 22, 24, to rotate about the upper and lower pins 102, 100.

The hydraulic actuators 38, 39 act to control the orientation of the trike 10 during normal vehicle operation. When entering a turn, one of the hydraulic actuators 38, 39 extends in length while the other retracts, moving the trike 10 into a leaning position as illustrated in FIG. 4. When the trike 10 is leaving the turn, the hydraulic actuators 38, 39 act to bring the trike 10 back to a vertical orientation as illustrated in FIG. 3.

The hydraulic actuators are controlled by an electronic leaning suspension control system or unit as enhanced by an electronic control circuit illustrated in FIG. 14. The configuration of the electronic control unit is generally known in the art, albeit the control circuit of FIG. 14 presents an improvement in the art because of features further described below. In one embodiment, the electronic control unit comprises a digital computer apparatus having a processor, ROM, RAM and I/O apparatus coupled to actuatable elements of the vehicle, for receiving input signals and delivering output signals. The electronic control unit stores and runs a control program while the vehicle is in use. A sensor suite (not shown) may be provided for supplying control-related data to the controllers. Typical control means are described in U.S. Pat. No. 6,564,129, incorporated herein by reference.

The substantially horizontal orientation of the transverse beam 30 is maintained by the influence of the spring dampers 36. The lower control arms 34 are connected to the front wheels 22, 24 through the spindles 44 and to the transverse beam 30 by the spring dampers 36. The front wheels 22, 24, and thus the lower control arms 34, remain substantially parallel to the road during normal operation. The road is generally substantially planar for the width of the trike 10, meaning that as long as both front wheels 22, 24 are in contact with the road, whether cornering or tracking a straight line, the spring dampers 36 will bias the transverse beam 30 to an orientation substantially parallel to the road. The hydraulic actuators 38, 39 connect the frame 16 to the transverse beam 30, and control the lean of the trike 10. As the hydraulic actuators 38, 39 extend, they push the frame 16 away from the transverse beam 30, initiating lean. The biasing force from the spring dampers 36 acting on the transverse beam creates a larger moment about the central pivot 86 than the hydraulic actuators 38, 39, so extension of the hydraulic actuators 38, 39 moves the frame 16 with respect to the beam 30.

Using hydraulic actuators 38, 39 as discussed affords some major advantages to trikes. First, since the lean of the trike 10 is controlled by the hydraulic actuators 38, 39, the upper and lower control arms 32, 34, spring dampers 36, and steering components are free to act normally, regardless of the trikes lean. This allows the trike 10 to absorb bumps while tracking an arcuate path in the same manner it would if it were tracking a straight line, making for a consistent suspension action, even while turning.

As stated previously, upon failure, deactivation, or malfunctioning of the hydraulic lean control system, it is desirable that the vehicle is returned to and maintains an upright (no lean) configuration until hydraulic control can be restored. It is also desirable that this upright configuration of the vehicle, in the absence of hydraulic control, be as stable as possible.

Figure 7:
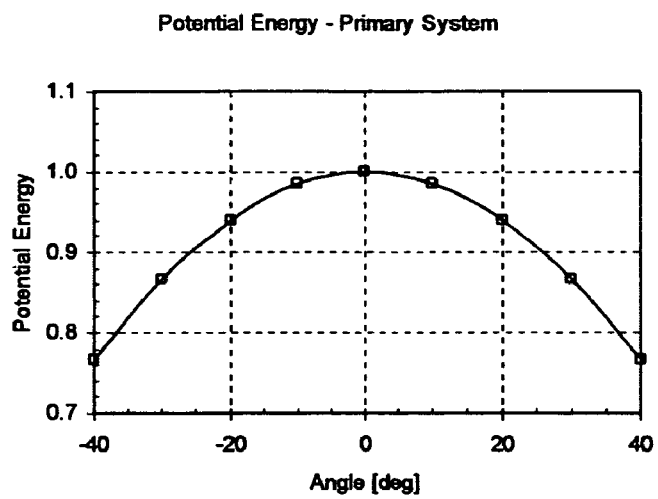
FIG. 7 is a graphical representation of a potential energy function describing the vehicle state during operation of the primary vehicle lean control system.

Instability in the configuration of the vehicle may be characterized as a relatively greater amount of potential energy stored within the configuration of the vehicle system. FIG. 7 is a graphical representation of a potential energy function describing the vehicle state during operation of the primary vehicle lean control system. In FIG. 7, the stability is expressed as a potential energy function of the vehicle system in a static case (i.e., when the vehicle velocity is zero), with a lower system potential energy reflecting a more stable orientation of the vehicle. In FIG. 7, the potential energy of the vehicle system is shown as a function of the lean angle of the vehicle provided by the vehicle lean control system. As seen in FIG. 7, the potential energy of the vehicle system is relatively lower at greater lean angles, due to a shift of the vehicle center of gravity to a position of lesser elevation. In contrast, a relatively less stable vehicle configuration is represented in FIG. 7 by a relative maximum potential energy of the system, which occurs when the vehicle is in the upright or on-center position. At a lean angle of zero degrees (i.e., when the vehicle is in an upright position), the vehicle center of gravity is at its highest point, and the vehicle system potential energy is relatively high.

In view of the above, upon failure, malfunction, or deactivation of the primary lean control system, it is desirable to achieve a predetermined vehicle lean angle which is closest to an upright position of the vehicle and at which the vehicle system has a relatively low potential energy. In the present invention, this is accomplished by employing an auxiliary lean control system which brings the vehicle body to a desired, predetermined lean angle upon failure, malfunction, or deactivation of the primary lean control system. In general, the energy applied by the auxiliary lean control system to adjust the lean angle to a predetermined value necessary for maximum stability will depend on the difference between the current lean angle of the vehicle and the desired predetermined lean angle of the vehicle. The auxiliary lean control system stores a quantity of energy sufficient to return a portion of the vehicle to the desired predetermined lean angle for stability.

Figure 8:
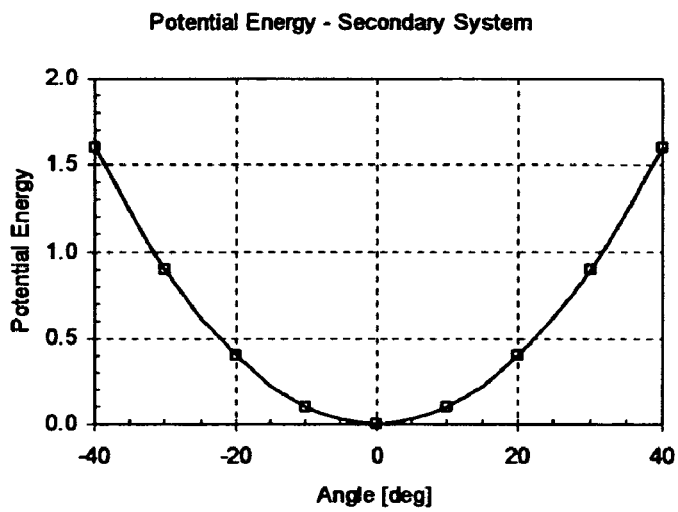
FIG. 8 is a graphical representation of a potential energy function of an auxiliary lean control system in accordance with the present invention.

In a particular embodiment illustrating the principles of the present invention, it is desirable that the vehicle system have a relatively low potential energy when the vehicle is in an upright position (i.e., when the vehicle has a lean angle of approximately zero) and resting on a substantially flat surface. FIG. 8 is a graphical representation of a potential energy function of an auxiliary lean control system in accordance with the present invention. FIG. 8 illustrates the energy input into the vehicle system by the auxiliary lean control system to adjust the lean angle of a portion of the vehicle to approximately zero, as a function of the lean angle of the portion of the vehicle when the primary lean control system becomes inactive. As seen in FIG. 8, the potential energy input by the auxiliary lean control system is greatest at the largest vehicle lean angle shown because the greater the difference between the existing vehicle lean angle and the desired predetermined lean angle for vehicle stability (in this case zero degrees), the greater the energy that must be expended by the auxiliary system in returning the vehicle to the desired predetermined lean angle.

The force required to adjust the vehicle lean angle (or other vehicle orientation parameter) can be transmitted to the suspension system via any of a variety of known alternative means (for example, using a crank mechanism). The actual structure utilized will depend on the specifics of the application and the interface of the articulation system hydraulics.

FIG. 9 is an exploded view of one embodiment of an auxiliary lean control system 26 in accordance with the present invention, coupled to transverse beam 30. Auxiliary lean control system 26 generally includes an energy storage device for storing energy to actuate the lean control system, a stabilizing mechanism coupled to the energy storage device and to the leanable portion of the vehicle for applying energy received from the energy storage device to the leanable portion of the vehicle, and a linkage coupled to the energy storage device and to the stabilizing mechanism for transferring energy from the energy storage device to the stabilizing mechanism.

In the embodiment shown in FIG. 9, the energy storage device comprises a power cylinder 132 coupled to a portion of the main bulkhead 42 below the frame 130, the linkage comprises a shaft 134, and the stabilizing mechanism comprises a roller assembly 136 and a cam 138. Referring to FIG. 9, a frame 130 is coupled to a portion of the main bulkhead 42 adjacent the transverse beam 30 and includes two parallel plates 140 extending vertically from a base 142. The plates 140 are substantially identical, but one of the plates includes a clearance cut 148 to allow full rotation of an angle sensor 150 connected to the cam 138. Both plates 140 define a central aperture 144 aligned with the center pivot point 60 of the transverse beam 30 and a guide slot 146 for the roller assembly 136. The central aperture 144 defined by each plate 140 is adapted to rotatably support the keyed shaft 61 using a bushing 152. The guide slot 146 extends vertically below the central aperture 144, and provides a limiting path of travel for the roller assembly 136.

The power cylinder 132 is coupled to a portion of the main bulkhead 42 below the frame 130, and is coupled to the base 142 of the frame 130. The power cylinder 132 includes a housing 154, first and second cylinders 156, 158, a piston 160 movable inside the first cylinder 156, and a cap 162 sealing the second cylinder 158. The cylinders 156, 158 are in fluid communication through an aperture (not shown) at the bottom of the cylinders 156, 158. The circumference of the piston 160 forms a seal with the inner wall of the first cylinder 156. The volume of the first cylinder 156 above the piston 160 is in fluid communication with a hydraulic system 200 of the trike 10, and the second cylinder 158 (and thus the volume of the first cylinder 156 below the piston 160), is filled with a compressible fluid, such as a pressurized gas. Although the energy source for the embodiment of the auxiliary lean control system described herein comprises a compressible fluid, alternative energy sources are also contemplated, for example, a hydraulic sub-system or a spring system.

The shaft 134 is coupled to the piston 160 at a first end, and coupled to the roller assembly 136 at a second end, such that linear movement of the piston 160 along an axis defined by the first cylinder 156 will cause the roller assembly 136 to move in the same fashion.

The power cylinder 132 includes a hydraulic port 164, a pressure sensor 166, and a gas fitting 168. The hydraulic port 164 allows the first cylinder 156 to be placed in fluid communication with the hydraulic system 200 of the trike 10. The pressure sensor 166 allows the pressure in the first cylinder 156 to be monitored by the electronic control system. The gas fitting 168 allows the second cylinder 158 to be filled with the pressurized gas.

The roller assembly 136 includes three individual rollers 174, 176 connected by a roller shaft 170. A roller body 172 is coupled to the second end of the shaft 134 and is adapted to rotatably support the roller shaft 170. The rollers 174 at the ends of the roller shaft 170 move within the guide slots 146 in the frame 130. The center roller 176 is adapted to move toward the cam 138 when the piston 160 moves upward in the first cylinder 156, and move away from the cam 138 when the piston 160 moves downward in the first cylinder 156.

The cam 138 includes a central aperture 178, a roller recess 180, and two protruding lobes 182. The keyed shaft 61 extends through the aperture 178 to support the cam 138 between the two parallel plates 140 of the frame 130. The roller recess 180 is positioned between the protruding cam lobes 182, and has a profile matching that of the center roller 176. The lobes 182 are angularly offset from each other, and include substantially identical inner profiles adapted to engage the center roller 176.

Figure 10:
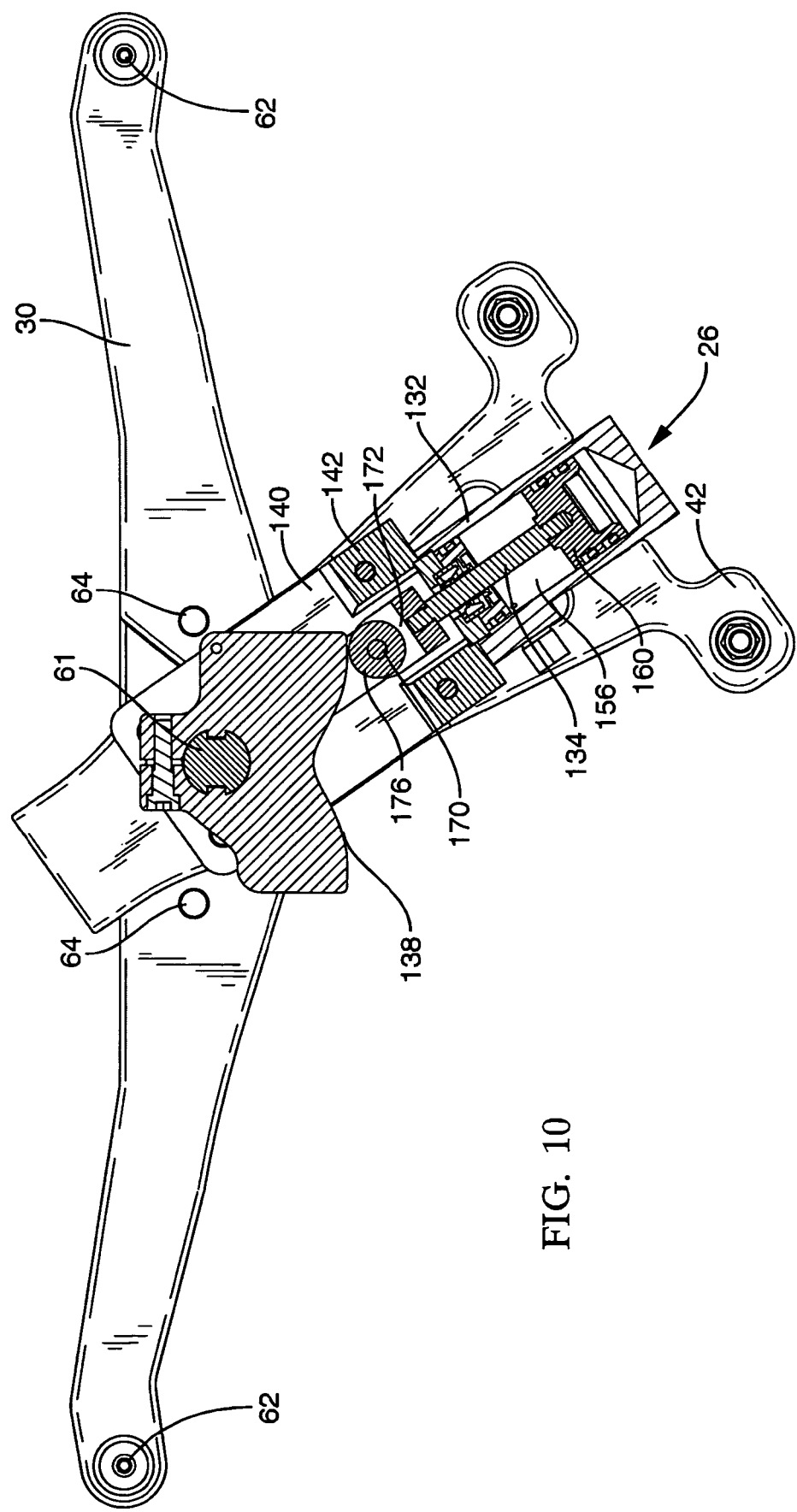
FIG. 10 is a section view of the auxiliary lean control system of the three-wheeled motorcycle of FIG. 1, illustrating the three-wheeled motorcycle in a leaning position.
Figure 11:
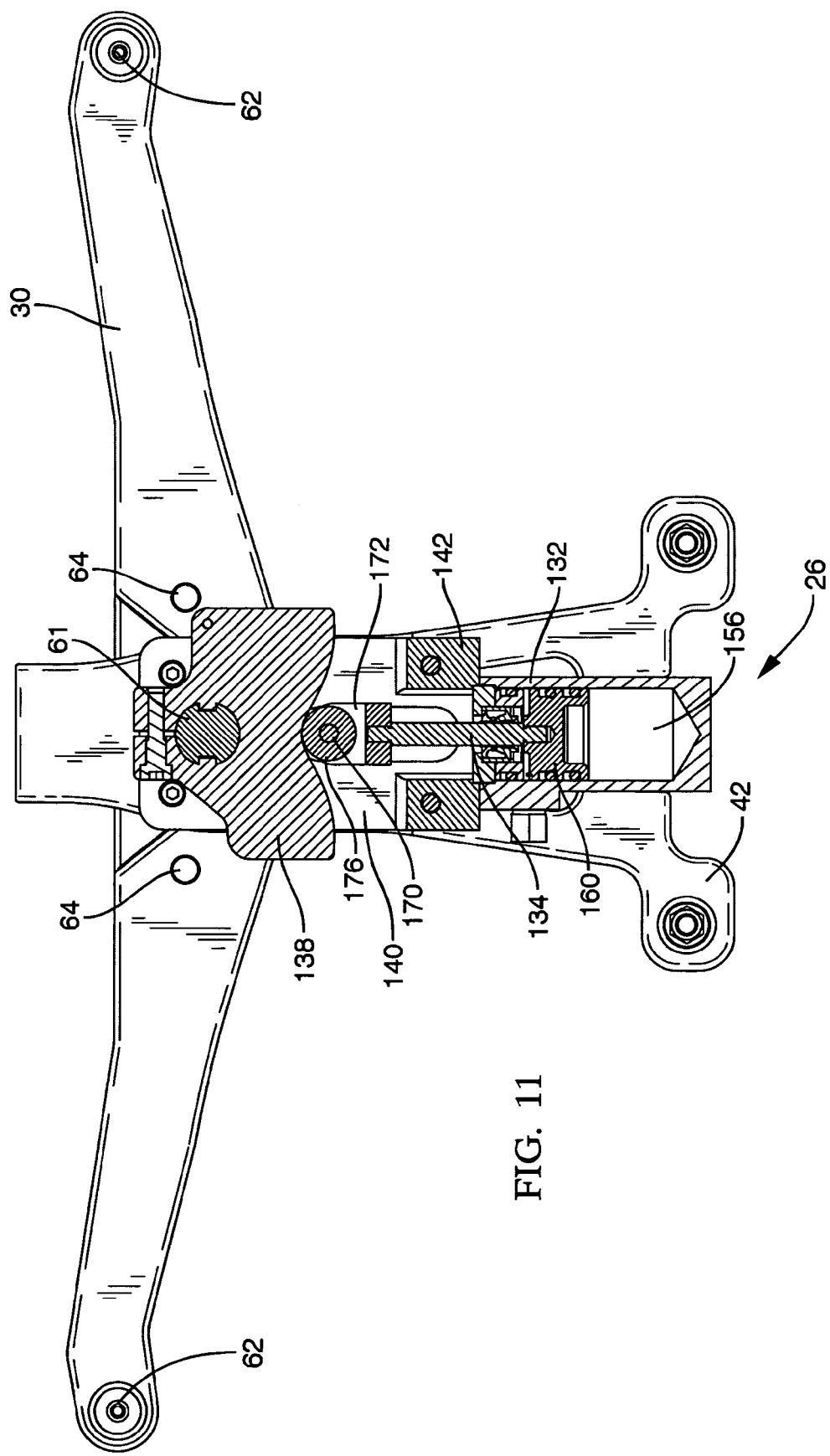
FIG. 11 is a view similar to FIG. 8, illustrating the three-wheeled motorcycle in an upright position.

FIGS. 10 and 11 are section views of the auxiliary lean control system 26 illustrating the trike 10 in a leaning position and an upright position, respectively. Since the transverse beam 30 and the cam 138 are both supported by the keyed shaft 61, they will not rotate with respect to one another. As the trike 10 leans, the transverse beam 30 and the cam 138 remain substantially horizontal. From the perspective of the cam 138, the rest of the trike 10 appears to rotate about the keyed shaft 61. This is illustrated best in FIG. 10, where it is clear that when the trike 10 leans, the auxiliary lean control system 26 appears to rotate about the keyed shaft 61.

When the primary lean control system is functioning properly, the pressure from the hydraulic fluid in the first cylinder 156 is greater than the pressure of the compressed gas in the second cylinder 158. This forces the piston 160 downward, and disengages the roller assembly 136 from the cam 138, placing the auxiliary lean control system 26 into an unengaged position (FIG. 10). When any of the above mentioned hydraulic system failures occur, pressure is also lost to the first cylinder 156. This allows the compressed gas in the second cylinder 158 to expand and push the piston 160 up, placing the auxiliary lean control system 26 into an engaged position, where the roller assembly 136 is in contact with the cam 138 (FIG. 11). The pressure from the compressed gas is large enough that the center roller 176 pushes on the inner profile of one of the cam lobes 182 with enough force to drive the center roller 176 into the cam recess 180, bringing the trike 10 to an upright position. As long as the hydraulic system is not pressurized, the pressure in the second cylinder 158 will be greater than the pressure in the first cylinder 156. This will keep the center roller 176 engaged with the cam roller recess 180 and will prevent the trike 10 from leaning.

In the event that a failure occurs other than hydraulic system pressure loss, an Engine Control Unit (ECU, not shown) or other similar mechanism is capable of eliminating hydraulic fluid pumping, and thus hydraulic pressure. This also relieves the pressure in the first cylinder 156, allowing the auxiliary lean control system 26 to function. When the hydraulic system is pressurized again, the pressure in the first cylinder 156 will again be greater than the pressure in the second cylinder 158. This forces the piston 160 downward, disengaging the roller assembly 136 from the cam 138 and allowing the bike 10 to function normally.

The embodiment just described is adapted for bringing a portion of the trike to a lean angle of approximately zero degrees (corresponding to an upright position) when the trike resides on a substantially level road surface. In this case, piston 160 forces roller assembly 136 to rollingly engage the contoured surface of cam 138 until the roller assembly is centered along the contoured surface of the cam. The rollers become nested and locked within the grove formed in the cam surface when a lean angle of approximately zero degrees is achieved. Pressure applied by piston 160 holds the rollers in place, which locks the auxiliary lean control system in the zero-degree lean angle configuration and prevents the vehicle from leaning away from this position, thereby providing an upright vehicle configuration having a relatively low potential energy.

Figure 12:
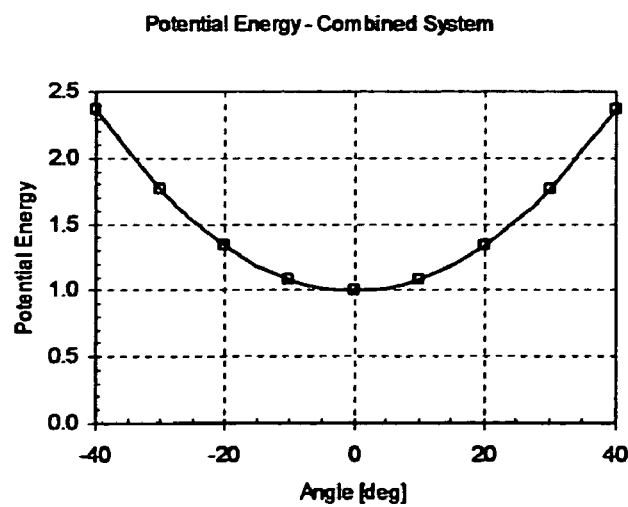
FIG. 12 shows a resultant potential energy function derived by applying the energy stored in the auxiliary lean control system represented in FIG. 7 to the vehicle system, effectively combining the potential energy function shown in FIG. 7 with the potential energy function shown in FIG. 8.

FIG. 12 shows a resultant potential energy function derived by applying the energy stored in the second lean control system to bring the vehicle body to an upright configuration in which the lean angle to approximately zero (on a substantially level road surface), effectively combining the potential energy function shown in FIG. 7 with the potential energy function shown in FIG. 8. In addition, when the vehicle body is brought to an upright position, the vehicle body is locked in the upright position by the auxiliary lean control system to prevent the vehicle body from leaning in either lateral direction while the first lean control system is non-functioning and while the second lean control system is engaged. It may be seen from FIG. 3 that the upright configuration of the vehicle with the leaning suspension system locked in a zero or near-zero lean angle configuration is a relatively stable configuration of the vehicle, since a non-zero vehicle lean angle may only be achieved by tilting or rolling the entire vehicle, thereby creating a vehicle configuration at a state of relatively higher potential energy than that provided by the upright, zero lean-angle configuration.

The shape of the auxiliary system potential function of FIG. 8 may be controlled by a combination of accumulator pressure and system mechanics (cam dimensions, etc.). The optimum shape of the function will be determined by factors such as the configuration of the vehicle upon deactivation of malfunction of the primary lean control system, and the desired final configuration of the vehicle. A potential function representing the final vehicle configuration (and combining the potential functions shown in FIGS. 7 and 8) is shown in FIG. 12. The shape of the combined function in any particular application will be determined by the desired final configuration of the vehicle.

FIG. 10 is a schematic illustrating the hydraulic system 200 of the trike. The hydraulic system 200 includes a pump 201, a filter 202, four proportional control valves PCV1-PCV4, a centering valve 204, a centering enable valve 206, a pressure sensor 208, a temperature sensor 250, and a reservoir 220. FIG. 10 also shows that the hydraulic actuators 38, 39 include top fluid chambers 210, 211 and bottom fluid chambers 212, 213, respectively. These fluid chambers are defined by a movable piston 214 rigidly connected to a shaft 216.

The pressurized hydraulic fluid supplied to the system 200 by the pump 201 passes through the filter 202 first to remove any contaminants. After passing through the filter 202, hydraulic fluid is supplied to valves PCV1, PCV2, and centering valve 204. Each of the valves PCV1-PCV4 receives instructions to either open or close from an Electronic Control Unit, or ECU 217. Each of the valves may be completely closed or open individually to any varying degree until it is completely open, however, to simplify explanation, the valves PCV1-PCV4 will be referred to as being either open or closed.

First, to cause the trike 10 to lean to the right, valves PCV1 and PCV4 are completely closed while PCV2 and PCV3 are completely open. This situation permits the pumping of fluid through PCV2 and into hydraulic actuator chambers 211 and 212. This will cause the left actuator 38 to extend in length while the right actuator 39 retracts. At the same time, fluid from hydraulic actuator chambers 210 and 213 is forced out of the hydraulic actuators 38, 39 by the pistons 214. The fluid exiting the chambers 210, 213 is forced through open valve PCV3 and to the reservoir 220. In the second condition, causing the trike 10 to lean to the left, valves PCV2 and PCV3 are completely closed while PCV1 and PCV4 are completely open. This situation permits the pumping of fluid through PCV 1 and into hydraulic actuator chambers 210 and 213. This will cause the right actuator 39 to extend in length while the left actuator 38 retracts. At the same time, fluid from hydraulic actuator chambers 211 and 212 is forced out of the hydraulic actuators 38, 39 by the pistons 214. The fluid exiting the chambers 211, 212 is forced through open valve PCV4 and to the reservoir 220.

Referring to the auxiliary lean control system 26, it is mechanically controlled, and is only operable when the trike 10 needs assistance maintaining an upright position (i.e., when the hydraulic system 200 is no longer able to supply enough pressure to properly utilize the hydraulic actuators 38, 39). Loss of hydraulic system pressure can occur in a number of different ways. When the trike 10 is parked and turned off, the hydraulic pump 201 is no longer applying pressure to the hydraulic system 200, so the hydraulic actuators 38, 39 will not be capable of supporting the trike 10. If the hydraulic system 200 fails in any way (i.e. pump failure, ruptured hose, punctured hydraulic actuator, etc.), pressure will also be lost, even if the engine 12 is still running and the trike 10 is still operable. Yet another potential failure could occur if the electronic control system for the hydraulic actuators 38, 39 malfunctions. It should be noted that this list of failure modes is not complete and can include other programmed faults, even unrelated to the hydraulic system. Regardless of how hydraulic pressure is lost, the auxiliary lean control system 26 will return the trike 10 to an upright and safe position.

As explained above, hydraulic fluid is supplied to the centering valve 204. When the hydraulic system 200 is functioning properly, the centering valve 204 is open, allowing fluid to be pumped into the first cylinder 156 of the auxiliary lean control system 26. The pressure from the hydraulic fluid in the first cylinder 156 is greater than the pressure of the compressed gas in the second cylinder 158. This forces the piston 160 downward, and disengages the roller assembly 136 from the cam 138, placing the auxiliary lean control system 26 into an unengaged position. When the pressure in the first cylinder 156 reaches a predetermined level measured by the pressure sensor 166, the ECU 217 instructs the centering valve 204 to close. While the centering valve 204 is closed, pressure is maintained in the first cylinder 156. This ensures that the auxiliary lean control system 26 will remain in the unengaged position, even if hydraulic system pressure fluctuates. However, if hydraulic system pressure falls to a predetermined level, the ECU 217 will instruct the centering valve 204 to open. This will bring the first cylinder 156 back into fluid communication with the hydraulic system 200, and consequently allow the fluid contained in the first cylinder 156 to be forced back into the de-pressurized hydraulic system 200 due to the pressure from the compressed gas in the second cylinder. At the same time, the auxiliary lean control system 26 will to move to an engaged position, where the roller assembly 136 is engaged with the cam. The pressure from the compressed gas is large enough that the center roller 176 pushes on the inner profile of one of the cam lobes 182 with enough force to drive the center roller 176 into the cam recess 180, bringing the trike 10 to an upright position. As long as the hydraulic system 200 is not re-pressurized, the pressure in the second cylinder 158 will be greater than the pressure in the first cylinder 156. This will keep the roller assembly 136 engaged with the cam roller recess 180 and will prevent the trike 10 from leaning.

If a failure occurs other than hydraulic system pressure loss, the ECU 217 is capable of eliminating hydraulic fluid pumping, and thus hydraulic pressure. This also relieves the pressure in the first cylinder 156, allowing the auxiliary lean control system 26 to function. When the hydraulic system 200 is pressurized again, the pressure in the first cylinder 156 will again be greater than the pressure in the second cylinder 158. This forces the piston 160 downward, disengaging the roller assembly 136 from the cam 138 and allowing the trike 10 to function normally.

Figure 13:
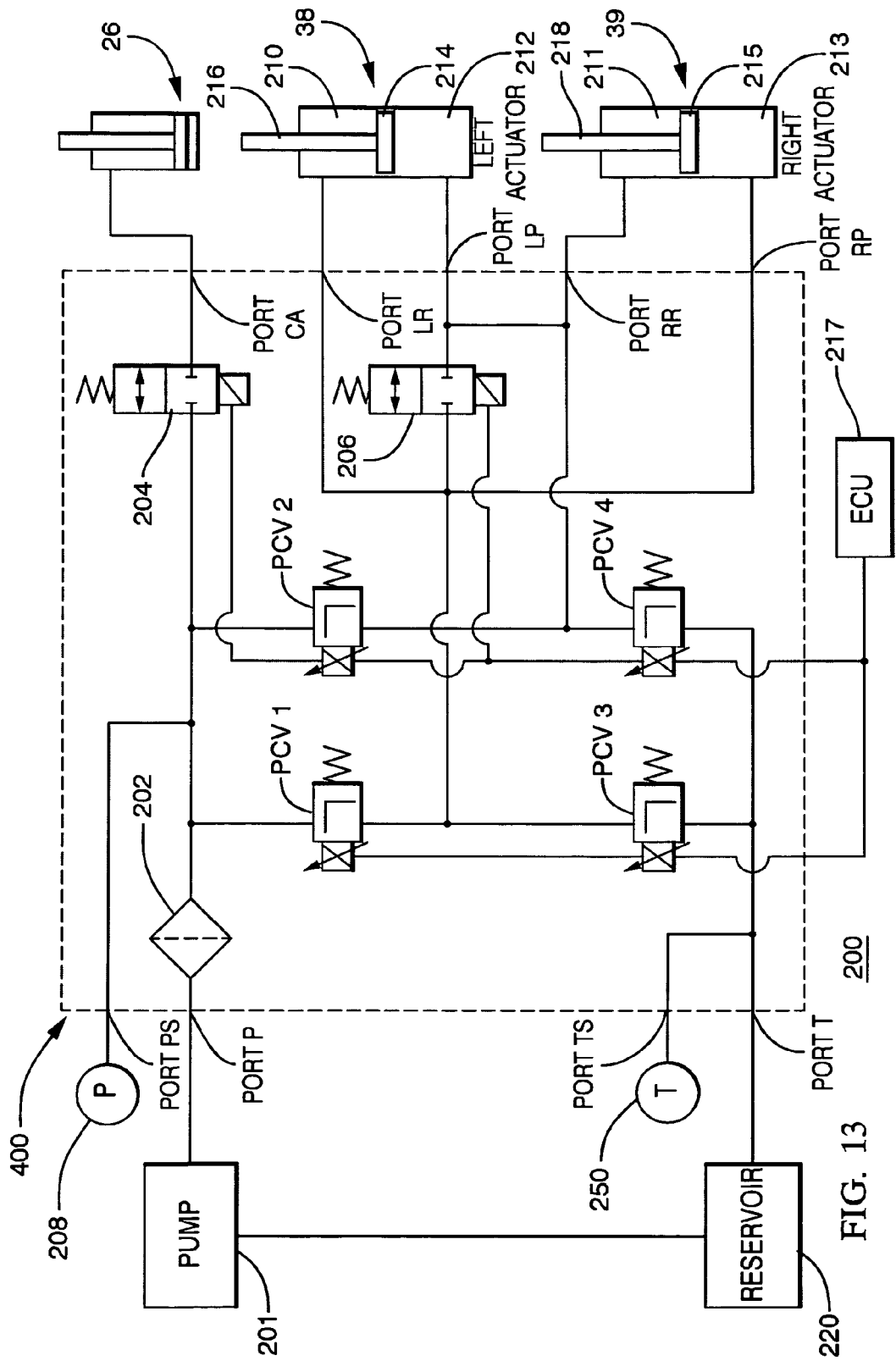
FIG. 13 is a schematic illustrating a hydraulic system of the three-wheeled motorcycle of FIG. 1.

Referring to FIG. 13, it can be seen that in the event of hydraulic system pressure loss, it is possible for a hydraulic system failure in which fluid is trapped between either hydraulic actuator chambers 210 and 213, or between chambers 211 and 212. This could occur if the ECU 217 malfunctions and doesn't allow valves PCV3 or PCV4 to open. If this occurs, the hydraulic actuators 38, 39 may become locked in their current state, which could potentially be when the trike 10 is in a leaning position. This will prevent the auxiliary lean control system 26 to operate, as the force it exerts on the transverse beam 30 will not be able to overcome the trapped hydraulic fluid. To remedy this situation, the centering enable valve 206 is opened when the centering valve 204 is opened. This allows hydraulic fluid to flow between any of the hydraulic actuator chambers 210-213 and prevents any hydraulic fluid from getting trapped between the hydraulic actuators 38, 39.

In yet another aspect of the present invention, a control module is designed to provide rapid response of the primary lean control system to vehicle directional changes, and thus improve vehicular stability. The schematic shown in FIGS. 14a-14c represent known technology and illustrate a control circuit 310 for controlling the energization of solenoid valves similar to those used in the primary lean control system described herein.

Figure 14A:
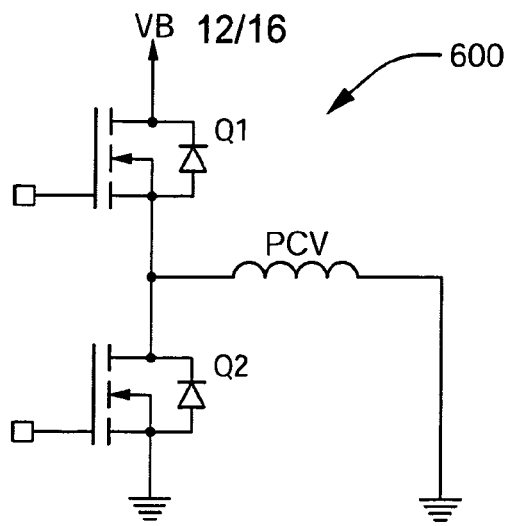
FIG. 14 exemplifies a control circuit for two directional control valves, wherein each valve is actuated by a respective high side driver and a respective low side driver.

Referring to FIG. 14a, a pressure control circuit 600 of control circuit 310 includes MOSFETs Q1 and Q2 that are energized with a pulse width modulated signal to energize a proportional pressure control valve PCV which regulates hydraulic system pressure.

Figure 14B:
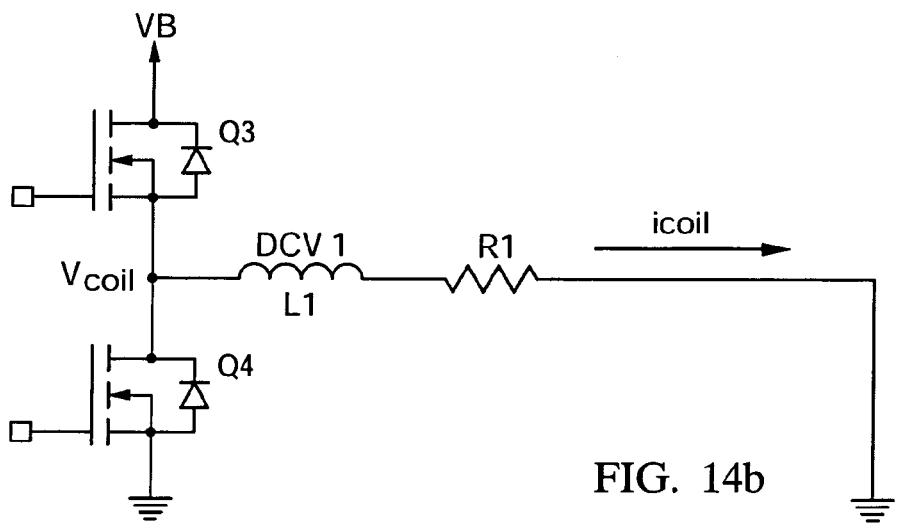
Figure 14C:
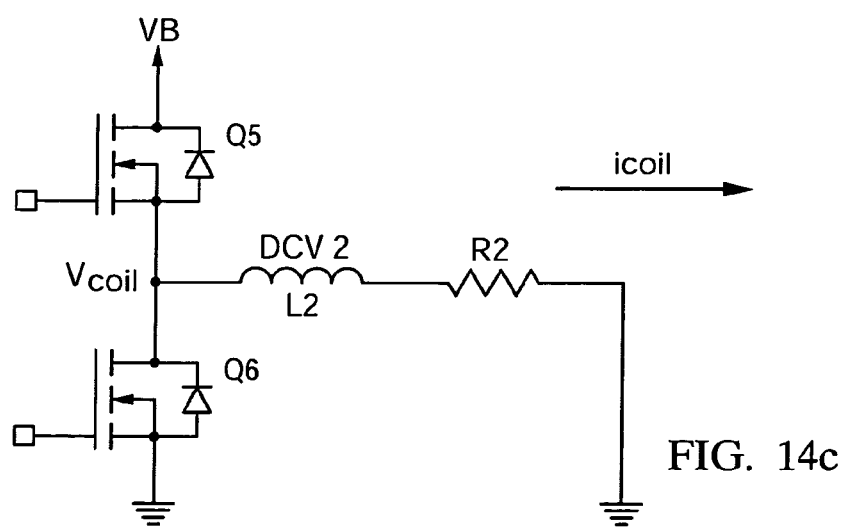
Figure 17:
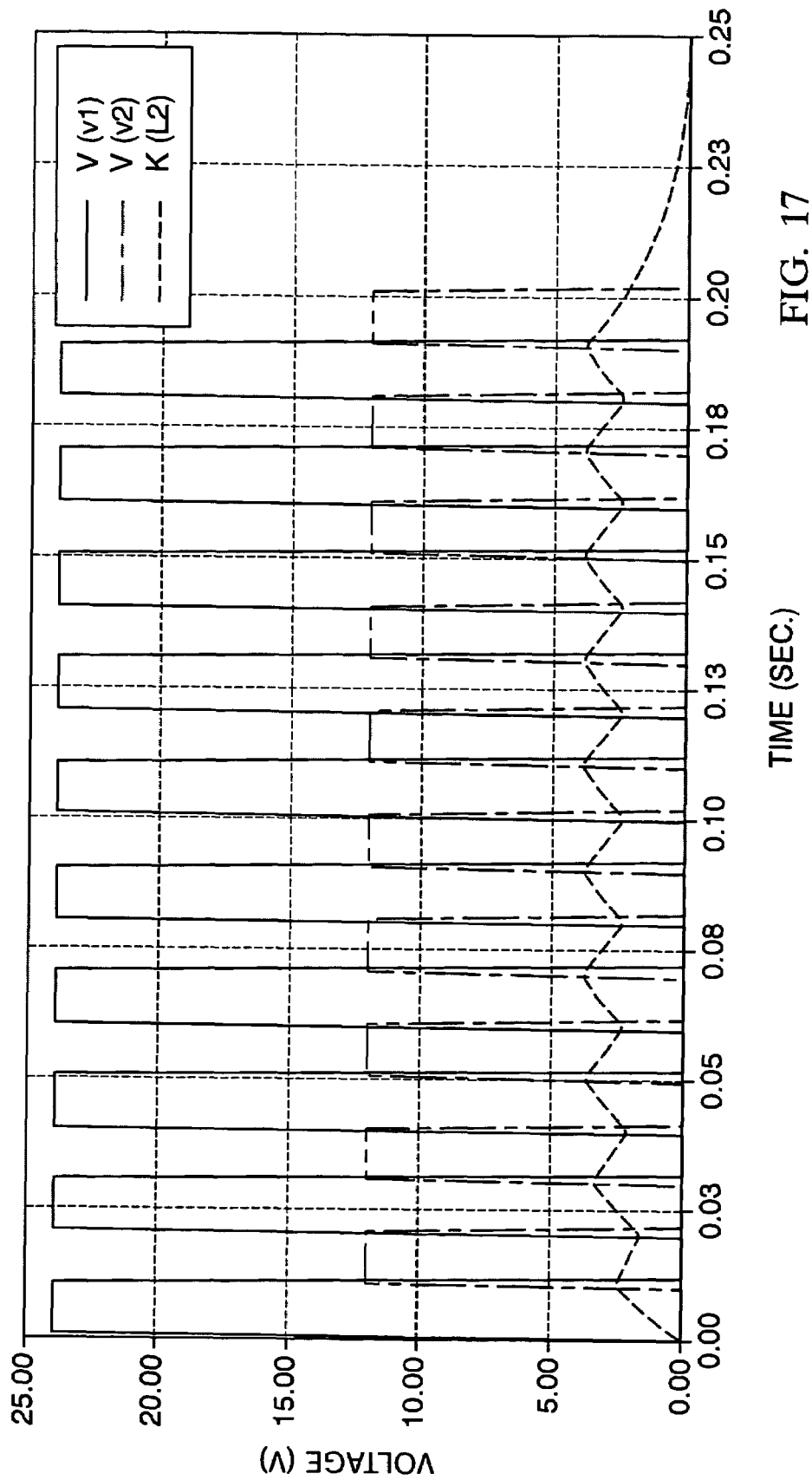
FIG. 17 graphically illustrates the energy dissipation of L1 with respect to the configuration of FIG. 14.

Referring to FIGS. 14b and 14c, control circuit 310 is also provided with a pair of directional control valves DCV1, DCV2 to control a flow of hydraulic fluid through respective flowpaths or hydraulic circuits in the hydraulic system. Referring to FIG. 14b, a first directional control circuit includes MOSFETs Q3 and Q4 which are energized with a pulse width modulated signal to provide a source voltage to first directional control valve DCV1 in a known manner. As shown, a current flows through coil L1 to a system common or ground. In the same manner, referring to FIG. 14c, when DCV1 is deactivated, DCV2 may be activated by providing a pulse width modulated signal to Q5 and Q6 to provide a source voltage to DCV2. As with DCV1, the current flows through coil L2 to a system common or ground. Discontinuing the inputs to Q3 and Q4, or to Q5 and Q6, results in deactivation of the respective solenoid, L1 or L2. The graph of FIG. 17 illustrates exponential (and therefore prolonged) decay of the coil current through DCV1 or DCV2 upon de-actuation of the same, when employing the known configuration of FIG. 14.

Figures 15A, 15B:
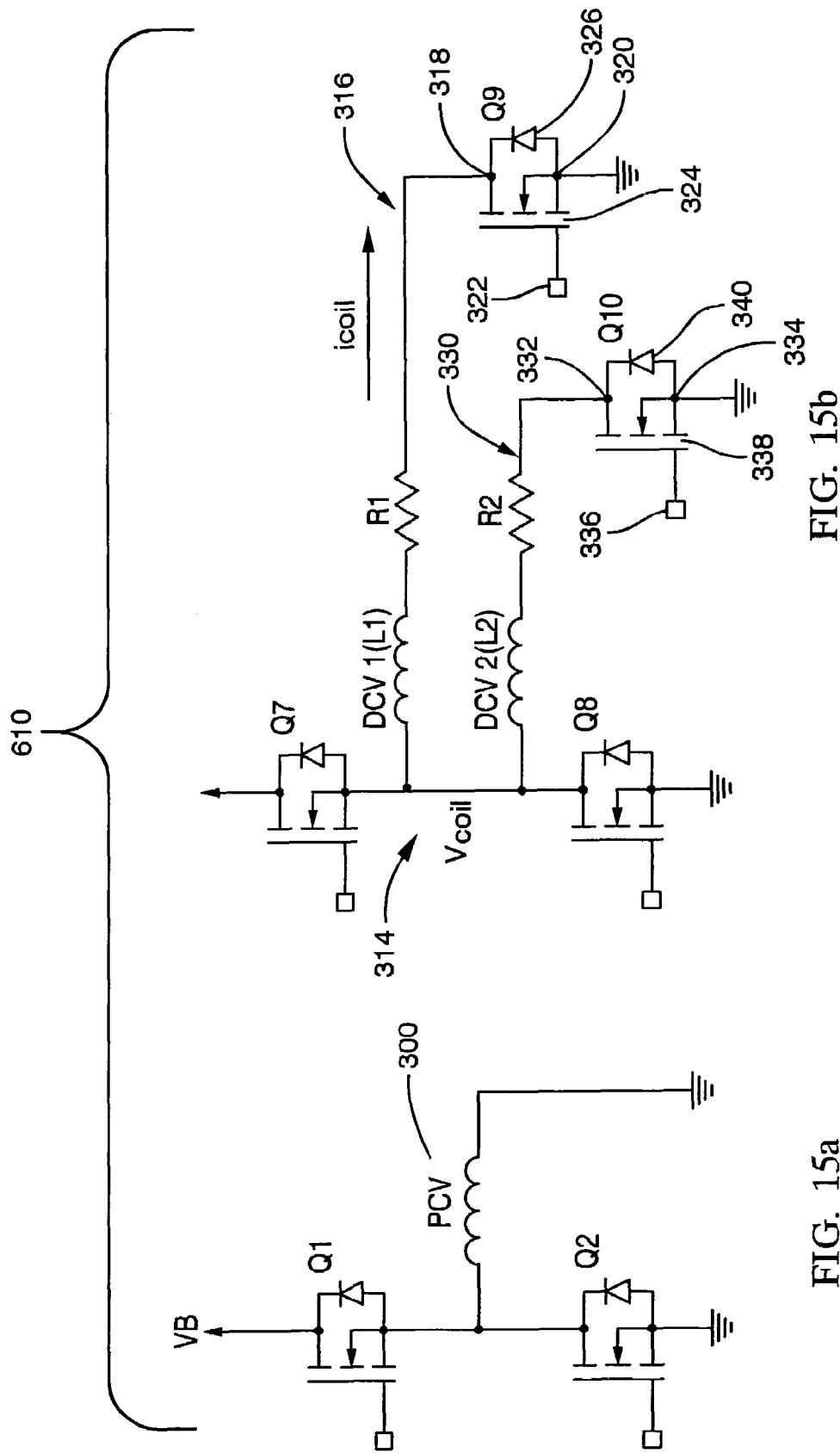
FIG. 15 exemplifies a control circuit relative to independent operation of the hydraulic actuators in the lean control system, wherein each directional control valve is independently actuated by a common high side driver and a respective low side driver in parallel with the high side driver.

FIG. 15 shows a control circuit in accordance with the present invention. A pressure control circuit 15a is provided that is substantially identical to pressure control circuit 600 of FIG. 14a. As shown in FIG. 15, a high side driver 314 contains two MOSFETs Q7 and Q8 connected in series to system common or ground and to a power supply or battery voltage. A first high side MOSFET Q7 contains a first gate, a first source, and a first drain. A second high side MOSFET, Q8 contains a second gate, a second source, and a second drain. The drain of Q7 is connected to the source of Q8, while the source of Q7 is connected to system ground. A first input is provided to the gate of Q7 for activation of Q7. The drain of Q8 is connected to battery voltage, thereby providing a voltage potential between Q8 and Q7, as a pulse width modulated signal is provided to Q7 and Q8.

Figure 16:
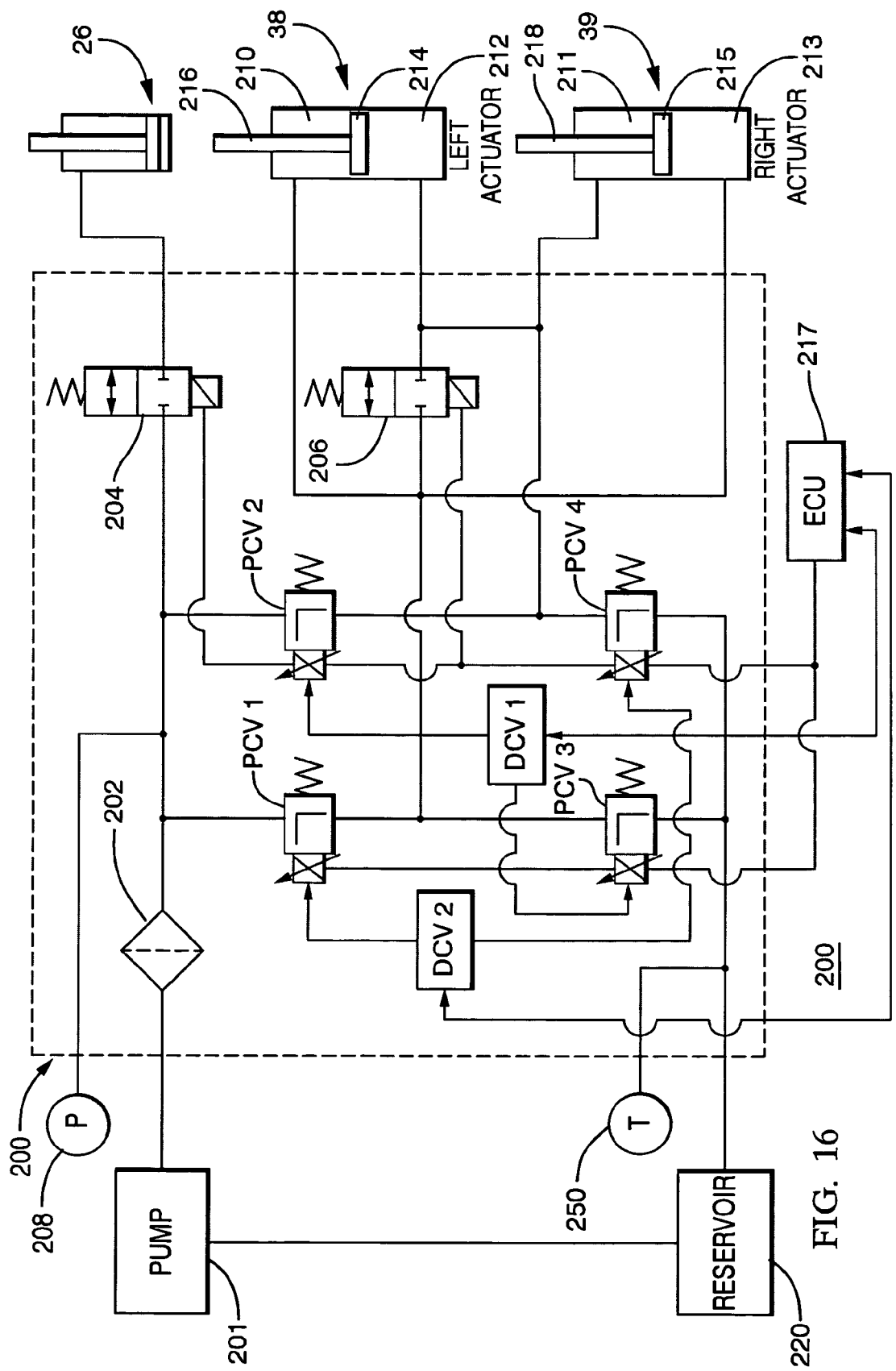
FIG. 16 schematically illustrates a hydraulic system used to actuate the hydraulic actuators of the present invention, in conjunction with the control circuit of FIG. 15.

FIG. 16 shows a hydraulic system used to actuate the hydraulic actuators of the present invention, in conjunction with the control circuit of FIG. 15. In the embodiment shown in FIG. 16, proportional control valves PCV1-PCV4 are solenoid-actuated spool valves adapted for controlling the speed and direction of hydraulic fluid to actuators 38, 39. Alternatively, depending on the force requirements of a particular application, pilot-solenoid valves may be used. As is known in the art, this type of valve uses a solenoid to control the flow of a pressurized fluid which powers an actuator that shifts the main flow-directing element of the valve.

The four proportional pressure control valves PCV1-PCV4, control fluid flow and pressure to the hydraulic actuators 38 and 39. In the embodiment shown in FIG. 16, PCV1 and PCV4 are controlled together and PCV2 and PCV3 are controlled together. This configuration permits control of actuators 38 and 39 using one high side and two low side drivers, in a manner described in greater detail below.

In the embodiment shown in FIG. 16, each of valves PCV1-PCV4 is normally open. Thus, a control current generated by (or controlled by) ECU 217 is applied to the solenoid of each valve to constrict one or more respective fluid flow paths through the valve, to a degree proportional to the applied current. In the spool valves used in the described embodiment, the displacement of the spool controlling opening and closing of the flow paths will be proportional to the applied current. As the valves are proportional control valves, the flow path through each valve may be constricted to any desired degree by the application of a proportionate current to an associated solenoid.

In the embodiments described herein, the modulating frequency of the pulse width modulated signals is within the range 2-10 kHz. However, as is known in the art, the duty cycle and modulating frequency of any pulse width modulated signal provided to an element of a control module in accordance with the present invention may be varied as needed according to the requirements of a particular application, and also according to such factors as a particular load's response time to a change in switch state, in order to achieve an optimum system response.

Referring to FIGS. 15 and 16, a first parallel circuit 316 containing a first actuator L1 is connected in parallel with high side driver 314, between MOSFETs Q7 and Q8. In the embodiment shown, L1 is solenoid-actuated valve DCV1 adapted for controlling the direction of hydraulic fluid flow through a portion of the hydraulic system. However, it may be appreciated that any of a variety of alternative solenoid-actuated or electronically-actuated components may be energized in a similar manner, according to the needs of a particular application. A first low side MOSFET Q9 is connected in series to L1 with DCV1 at a first low side drain 318. A first low side source 320 is connected to circuit ground potential. A first low side input 322 is connected to a first low side gate 324 of Q9, thereby enabling flow of an energizing input signal across the junction of Q9. A first diode 326 is connected in parallel to Q9 thereby enabling current flow from DCV1 through the first diode 326 and then to circuit ground potential once Q9 is de-energized (in a manner described in greater detail later), thereby preserving the integrity or reliability of Q9. Valve DCV1, when activated, energizes proportional control valves PCV2 and PCV3, thus permitting pressurized fluid to flow to the lower chamber 212 of hydraulic actuator 38 and the upper chamber 211 of hydraulic actuator 39, thereby imparting a rightward lean to a portion of the vehicle As also shown in FIGS. 15 and 16, a second parallel circuit 330 containing a second actuator L2 is also connected in parallel with the high side driver 314, between MOSFETs Q7 and Q8. In the embodiment shown, L2 is solenoid-actuated valve DCV2 adapted for controlling the direction of hydraulic fluid flow through a portion of the hydraulic system. However, it may be appreciated that any of a variety of alternative solenoid-actuated or electronically-actuated components may be energized in a similar manner, according to the needs of a particular application. A second low side MOSFET Q10 is connected in series with DCV2 at a second low side drain 332. A second low side source 334 is connected to circuit ground potential. A second low side input 336 is connected to a second low side gate 338 of Q10, thereby enabling flow of an energizing input signal across the junction of Q10. A second diode 340 is connected in parallel to Q10 thereby enabling current flow from DCV2 through the second diode 338 to ground once Q10 is de-energized, thereby preserving the integrity and, reliability of Q10. Valve DCV2, when activated, energizes proportional control valves PCV1 and PCV4, thus permitting pressurized fluid to flow to the upper chamber 210 of hydraulic actuator 38 and to the lower chamber 213 of hydraulic actuator 39, thereby imparting a leftward lean to the portion of the vehicle When employing the circuit of FIG. 15, corresponding system operation is described as follows. When the primary lean control system is energized, pressure control valve 500 (not shown in FIG. 15) is also energized. In a first condition, upon receipt of a signal from, for example, an angular sensor (not shown), a system algorithm (made in a known manner, but not shown) communicating with the circuit of FIG. 15 in a known manner, may cause the trike 10 to lean to the right. Accordingly, DCV1 is activated by providing a pulse width modulated signal to MOSFETs Q7 and Q8, and simultaneously activating Q9 by energizing the same through input 322, thereby proportionately actuating valves PCV2 and PCV3. As such, valves PCV1 and PCV4 are completely closed while PCV2 and PCV3 are open to a degree proportional to a current applied to each of the valve solenoids. This situation permits the pumping of fluid through PCV2 and into hydraulic actuator chambers 211 and 212. This will cause the left actuator 38 to extend in length while the right actuator 39 retracts. At the same time, fluid from hydraulic actuator chambers 210 and 213 is forced out of the hydraulic actuators 38, 39 by the pistons 214. The fluid exiting the chambers 210, 213 is forced through open valve PCV3 and to the reservoir 220. In the second condition, and again upon receipt of a signal from angular sensor 312, the system algorithm of ECU 217 communicates with the circuit of FIG. 15 in a known manner, thereby causing the trike to lean to the left. Accordingly, DCV2 is activated by providing a pulse width modulated signal to MOSFETs Q7 and Q8, and simultaneously activating Q10 by energizing the same through input 336, thereby proportionately actuating valves PCV1 and PCV4. As such, valves PCV2 and PCV3 are completely closed while PCVI and PCV4 are open to a degree proportional to a current applied to each of the valve solenoids. This situation permits the pumping of fluid through PCV1 and into hydraulic actuator chambers 210 and 213. This will cause the right actuator 39 to extend in length while the left actuator 38 retracts. At the same time, fluid from hydraulic actuator chambers 211 and 212 is forced out of the hydraulic actuators 38, 39 by the pistons 214. The fluid exiting the chambers 211, 212 is forced through open valve PCV4 and to the reservoir 220. In a third condition, responsive to linear travel along the road, in the absence of a change of direction, angular sensor 312 fails to signal or initiate activation of the control circuit of FIG. 15, thereby resulting in a dormant status of Q7, Q8, Q9, and Q10 until directional change is required as recognized by ECU 217.

In sum, when energized by DCV1 or DCV2, PCV1 and PCV4, or PCV2 and PCV3, respectively, provide simultaneous pressure to an upper chamber of one hydraulic actuator and a lower chamber of the other hydraulic actuator, to provide a push-pull hydraulic lean control as described herein. Therefore, in accordance with the present invention, the circuit of FIG. 15 facilitates substantially or relatively instantaneous shut down of either DCV1 (corresponding to PCV2 and PCV3), or instantaneous shut down of DCV2 (corresponding to PCV1 and PCV4). Improved response relative to angular or rotational displacement about a steering member, as measured by a directional control sensor (not shown) thereby provides independent operation of a first and a second actuator, in this case DCV1 or DCV2, and yet simplifies the electronic configuration by requiring only one high side driver as compared to two or more independent high side drivers as known in the art.

Although a plurality of only two parallel loads are connected to the high side driver, as shown in FIG. 15, a greater plurality of parallel loads could also be connected to a high side driver in accordance with the present invention. The high side driver would still be pulse width modulated to provide a design-specific voltage accommodating the power requirements of any given system. In that case, one or more low side drivers could be selectively energized based on selective actuation of one or more low side MOSFET drivers, by direction of a respective control system in accordance with application specific design criteria.

Because valves DCV1 and DCV2 control fluid flow to hydraulic circuits imparting opposite lean directions to the vehicle, only one of valves DCV1 and DCV2 is energized at any given time. Also, for rapid lean control system response to changes in the direction of the vehicle, it is desirable for valves DCV1 and DCV2 controlling fluid flow to their respective portions of the system to be energized and de-energized as rapidly as possible. To achieve this, properties of the diodes incorporated into MOSFETs Q9 and Q10 are used to rapidly de-energize DCV1 and DCV2, respectively.

Referring again to FIG. 15, for purposes of discussion, it is assumed that DCV1 is energized and that it is desired to energize DCV2 in response to a change in vehicle direction (i.e., the vehicle is leaning to the right, and it is desired to lean the vehicle to the left). To energize DCV2, the input signal to gate 324 of MOSFET Q9 is interrupted, thereby de-energizing the MOSFET. Simultaneously, an input signal is provided to gate 358 of MOSFET Q10, as previously discussed. Due to the relatively slow response time of the inductive load element of DCV1 and the inability to rapidly dissipate the energy stored in DCV1 through the now de-energized MOSFET Q9, a spike in voltage is seen at drain 318 of MOSFET Q9 when MOSFET Q9 is de-energized. This voltage rapidly exceeds the avalanche voltage of diode 326 incorporated into Q9, at which point current flows through the diode toward the system common or ground, thereby rapidly dissipating the energy stored in DCV1. This rapidly de-energizes the hydraulic circuit supplying pressurized fluid to the system for imparting a rightward lean angle to the vehicle. When it is desired to change the vehicle lean direction from left to right again, the portion of the circuit incorporating DCV2 and Q10 operates in a similar manner.

Figure 18:
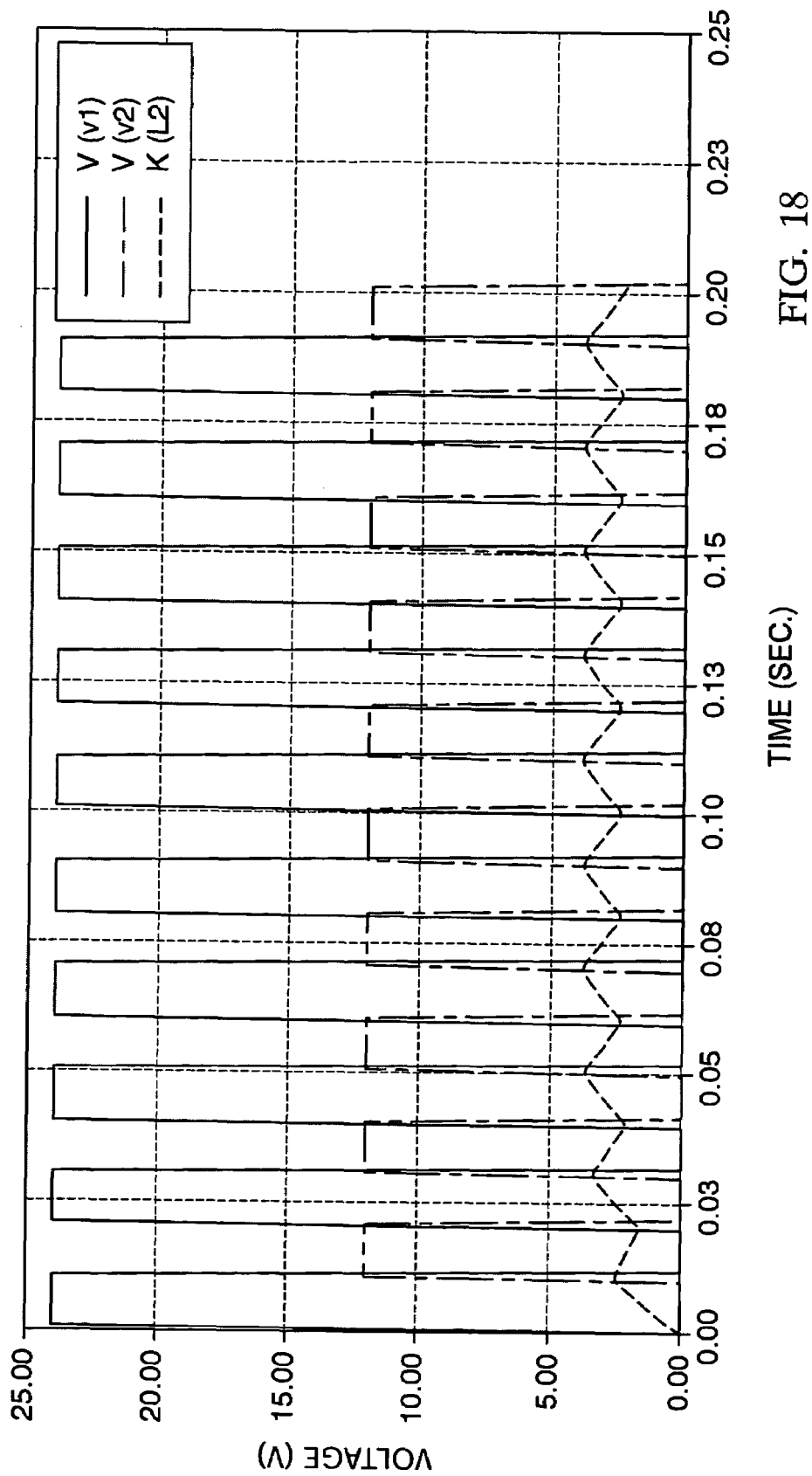
FIG. 18 graphically illustrates the improved energy dissipation of L1 with respect to the configuration of FIG. 15, in accordance with the present invention.

It may be seen from the above description that, upon de-energizing of Q9 or Q10, FIG. 18 illustrates a relatively abrupt termination of coil current, as compared to FIG. 17, when employing an electronic control module of FIG. 15. It will be appreciated that employing the low side MOSFETs Q9 and Q10, in conjunction with their respective diodes 326 and 340, respectively, results in a substantially instantaneous response to a vehicle directional change as measured by angular sensor 312 and the system algorithm. In accordance with a preferred embodiment, the avalanche voltages of diodes 326 and 346 in MOSFETs Q9 and Q10 are rated at about 60 volts, although the diodes may be rated at higher or lower voltages depending upon design considerations. It is believed that in normal operation (e.g. upon activation of either DCV1 or DCV2), system current travels from the high side driver through the respective activated parallel circuit, and therefore through the respective inductor, then through the respective low side MOSFET, Q9 or Q10, and then to circuit ground potential. When a vehicle directional change occurs, the respective actuator DCV1 or DCV2 is quickly drained of its voltage, by de-energizing the respective low side MOSFET, Q9 or Q10 respectively, and eliminating input therethrough as directed by system algorithm. As a result, energy stored in a respective one of valves DCV1 and DCV2 is then shunted from the respective actuator through the respective diode to ground. The respective low side MOSFET is thereby preserved for future operation, while the diode dielectric recovers for future use as well. In this manner, system reliability is substantially enhanced.

Unless otherwise noted, the elements of the electronic control systems and other features of the invention described herein may be fabricated, supplied, and/or interconnected using methods and articles known in the art. For example, angular sensors, electronic controllers, and other articles as described in U.S. Pat. Nos. 6,498,971, 6,776,634, 6,742,402, 6,805,362, 6,488,115, and 6,691,819, all incorporated herein by reference, exemplify the state of the art. It will also be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A control system comprising:
    an electronic driver circuit including a first high side MOSFET and a second high side MOSFET;
    a first parallel circuit including a first load and a first low side MOSFET connected in series therewith, said first low side MOSFET being selectively energizable to actuate said first load, said first low side MOSFET being connected to circuit ground potential, said first parallel circuit being connected in parallel with said electronic driver circuit between said first high side MOSFET and said second high side MOSFET;
    a second parallel circuit operatively coupled to said electronic driver circuit, said second circuit including a second load and a second low side MOSFET connected in series therewith, said second low side MOSFET being selectively energizable to actuate said second load, said second low side MOSFET being connected to circuit ground potential, said second parallel circuit being connected in parallel with said electronic driver circuit between said first high side MOSFET and said second high side MOSFET;
    wherein said electronic driver circuit is energized in conjunction with independently energizing either said first low side MOSFET to energize said first load, or said second low side MOSFET to energize said second load.

2. The control system of claim 1 wherein at least one of said first load and said second load is an electrically-driven actuator.

3. The control system of claim 2 wherein said electrically-driven actuator is an electrically-actuatable hydraulic valve.

4. The control system of claim 1 further comprising a first diode connected in parallel with said first low side MOSFET, said first diode being biased so as to prevent current flow therethrough when said first low side MOSFET is energized, said first diode being connected to circuit ground potential to enable discharge of said first circuit through said first diode upon de-actuation of said first low side MOSFET.

5. The control system of claim 4 further comprising a second diode connected in parallel with said second low side MOSFET, said first diode being biased so as to prevent current flow therethrough when said second low side MOSFET is energized, said second diode being connected to circuit ground potential to enable discharge of said second circuit through said second diode upon de-actuation of said second low side MOSFET.

6. The control system of claim 1 wherein said electronic driver circuit comprises:
    a first high side MOSFET including a first high side gate for receiving a first input signal, a first high side drain, and a first high side source; and
    a second high side MOSFET comprising a second high side gate for receiving a second input signal, a second high side drain, and a second high side source,
    said first high side drain being connected to a voltage source, said first high side source being connected to said second high side drain, and said second high side source being connected to circuit ground potential, wherein said electronic driver circuit is actuated by applying a pulse width modulated input signal to said first high side gate and said second high side gate.

7. The control system of claim 6 wherein said first circuit is independently actuated by energizing said first low side MOSFET and not said second low side MOSFET, and, said second circuit is independently actuated by energizing said second low side MOSFET and not said first low side MOSFET.

8. A vehicle employing said control system of claim 1.

9. A hydraulic control system employing said control system of claim 1.

10. A control system comprising:
    an electronic driver circuit including a first high side MOSFET and a second high side MOSFET;
    a first parallel circuit operatively coupled to said driver circuit, said first circuit including a first load and a first low side MOSFET connected in series therewith, said first low side MOSFET being selectively energizable to actuate said first load, said first low side MOSFET being connected to circuit ground potential, said first parallel circuit being connected in parallel with said electronic driver between said first high side MOSFET and said second high side MOSFET;

a second parallel circuit operatively coupled to said driver circuit, said second circuit including a second load and a second low side MOSFET connected in series therewith, said second low side MOSFET being selectively energizable to actuate said second load, said second low side MOSFET being connected to circuit ground potential, said second parallel circuit being connected in parallel with said electronic driver between said first high side MOSFET and said second high side MOSFET;

a first diode connected in parallel with said first low side MOSFET, said first diode being biased so as to prevent current flow therethrough when said first low side MOSFET is energized, said first diode being connected to circuit ground potential to enable discharge of said first circuit through said first diode upon de-actuation of said first low side MOSFET;

a second diode connected in parallel with said second low side MOSFET said first diode being biased so as to prevent current flow therethrough when said second low side MOSFET is energized, said second diode being connected to circuit ground potential to enable discharge of said second circuit through said second diode upon de-actuation of said second low side MOSFET, wherein said electronic driver circuit is energized in conjunction with independently energizing either said first low side MOSFET to energize said first load, or said second low side MOSFET to energize said second load.

11. A method of activating at least one of a plurality of actuators comprising the steps of:

providing an electronic driver circuit including a first high side MOSFET and a second high side MOSFET;

connecting a first parallel circuit to said electronic driver circuit between said first high side MOSFET and said second high side MOSFET, said first parallel circuit containing a first actuator in series with a first low side MOSFET, said low side MOSFET connected to circuit ground potential;

connecting a second parallel circuit to said electronic driver circuit between said first high side MOSFET and said second high side MOSFET, said second parallel circuit containing a second actuator in series with a second low side MOSFET, said second low side MOSFET connected to circuit ground potential;

connecting a first diode in parallel to the said first low side MOSFET, said first diode connected to circuit ground potential at its anode, and its cathode connected to a drain of said first low side MOSFET;

connecting a second diode in parallel to said second low side MOSFET, said second diode connected to circuit ground potential at its anode, and its cathode connected to a drain of said second low side MOSFET;

energizing said electronic driver circuit; and energizing at least one of said first parallel and second parallel circuits by energizing at least one of said first and second low side MOSFETs, respectively.

12. A control system employing said method of claim 11.

13. A vehicle employing said method of claim 11.

14. The method of claim 11 wherein said first parallel circuit is independently actuated by energizing said first low side MOSFET and not said second low side MOSFET, and, said second parallel circuit is independently actuated by energizing said second low side MOSFET and not said first low side MOSFET.

15. The method of claim 11 wherein said electronic driver circuit contains a first high side MOSFET containing a first high side gate for receiving a first input signal, a first high side drain, and a first high side source, and, a second high side MOSFET containing a second high side gate for receiving a second input signal, a second high side drain, and a second high side source, said first high side drain being connected to a voltage source, said first high side source being connected to said second high side drain, and said second high side source being connected to system ground, wherein energizing said electronic driver circuit is accomplished by applying a pulse width modulated input signal to said first high side MOSFET and said second high side MOSFET.

16. A control system comprising an electronic module, said module comprising:

an electronic driver circuit including a first high side MOSFET and a second high side MOSFET;

a first parallel circuit connected in parallel to said electronic driver circuit between said first high side MOSFET and said second high side MOSFET, said first parallel circuit comprising a first low side MOSFET and a first actuator connected in series with said first low side MOSFET, wherein said first low side MOSFET contains a first source, a first gate, and a first drain, said first source connected to circuit ground potential, said first gate connected to a first input, and said first drain connected to said first actuator, said first low side MOSFET selectively energizable to actuate said first actuator;

a second parallel circuit connected in parallel to said electronic driver between said first high side MOSFET and said second high side MOSFET, said second parallel circuit a second low side MOSFET and a second actuator connected in series with said second low side MOSFET, wherein said second low side MOSFET contains a second source, a second gate, and a second drain, said second source connected to circuit ground potential, said second gate connected to a second input, and said second drain connected to said second actuator, said second low side MOSFET being selectively energizable to actuate said second actuator;

a first diode in parallel with said first low side MOSFET biased to prevent flow therethrough during actuation of said first low side MOSFET; and a second diode in parallel with said second low side MOSFET biased to prevent flow therethrough during actuation of said second low side MOSFET, wherein said electronic driver is energized in conjunction with independently energizing either said first low side MOSFET or said second low side MOSFET.

17. The control system of claim 16 wherein said electronic driver circuit comprises a first high side MOSFET comprising a first high side gate, a first high side drain, and a first high side source, and, a second high side MOSFET comprising a second high side gate, a second high side drain, and a second high side source, said first high side gate having a first input, and said second high side gate having a second input, said first high side drain connected to voltage, said first high side source connected in series to said second high side drain, and said second high side source connected to circuit ground potential, wherein said electronic driver is actuated by applying a pulse width modulated signal to said first high side MOSFET and said second high side MOSFET.

18. The control system of claim 16 wherein said first and second actuators are inductive loads.

* * * * *